United States Patent [19]

Kumasaka et al.

[11] 4,444,705
[45] Apr. 24, 1984

[54] METHOD OF MANUFACTURING A CEILING STRUCTURE OF A VEHICLE

[75] Inventors: Hideyuki Kumasaka, Yokohama; Motoyuki Hiraoka, Tokyo; Tomokazu Ishidate, Kamakura; Hiroshi Hattori, Yokohama, all of Japan

[73] Assignee: Nissan Motor Company, Ltd., Yokohama, Japan

[21] Appl. No.: 230,295

[22] Filed: Jan. 30, 1981

Related U.S. Application Data

[62] Division of Ser. No. 107,530, Dec. 27, 1979, abandoned.

[30] Foreign Application Priority Data

Dec. 29, 1978 [JP] Japan ................. 53/164228

[51] Int. Cl.³ .............................................. B29D 27/00
[52] U.S. Cl. ................................... 264/46.5; 264/46.6;
264/46.7; 264/46.8; 264/DIG. 83; 425/812;
425/817 R
[58] Field of Search ................... 264/46.5, 46.6, 46.8,
264/46.7, DIG. 83; 425/817 R, 812

[56] References Cited

U.S. PATENT DOCUMENTS

| 3,084,973 | 4/1963 | Beckley .................... 264/46.5 X |
| 3,163,435 | 12/1964 | Krueger et al. ............ 264/46.5 X |
| 3,989,562 | 11/1976 | Hladik et al. .............. 264/46.5 X |
| 4,211,590 | 7/1980 | Steward et al. ............ 264/46.5 X |
| 4,303,728 | 12/1981 | Houdek et al. ............. 264/46.5 X |

FOREIGN PATENT DOCUMENTS

| 1876879 | 8/1963 | Fed. Rep. of Germany . |
| 6946205 | 3/1970 | Fed. Rep. of Germany . |
| 77418 | 10/1970 | German Democratic Rep. . |
| 54-58769 | 5/1979 | Japan .......................... 264/46.5 |
| 55-81128 | 6/1980 | Japan .......................... 264/46.5 |
| 56-118830 | 9/1981 | Japan .......................... 264/46.5 |
| 993042 | 5/1965 | United Kingdom . |
| 1123796 | 8/1968 | United Kingdom . |
| 1139196 | 1/1969 | United Kingdom ........ 264/46.5 |
| 2000717 | 1/1979 | United Kingdom ........ 264/46.5 |

OTHER PUBLICATIONS

Calvert, Robert, Edt. "The Encyclopedia of Patent Practice and Invention Management," New York, Reinhold, ©1964, p. 138.

Primary Examiner—Philip E. Anderson
Attorney, Agent, or Firm—Schwartz, Jeffery, Schwaab, Mack, Blumenthal & Koch

[57] ABSTRACT

The method comprises a masking step of closing by masking tapes a gap formed between a roof rail member provided at the inner periphery of an existing roof panel and the roof panel, a linear joint portion between the roof rail and pillar inner panels, and holes provided for securing parts to the roof rail. The method also includes a step of arranging a wire harness assembly at predetermined position a lining skin member below the roof panel by securing and fitting welts provided around the periphery of the lining skin member to the roof panel. A foaming mold setting step is then carried out by mounting a foaming mold having the same shape as a final shape of the lining skin member from a compartment of the vehicle. A heating step is then performed to preheat the whole ceiling portion to a predetermined temperature and a foaming composition injecting step of injecting a foaming composition into a spaced formed between the roof panel and the lining skin member is carried out. Finally, a foaming mold offsetting step of removing the foaming mold after foaming is performed.

9 Claims, 54 Drawing Figures

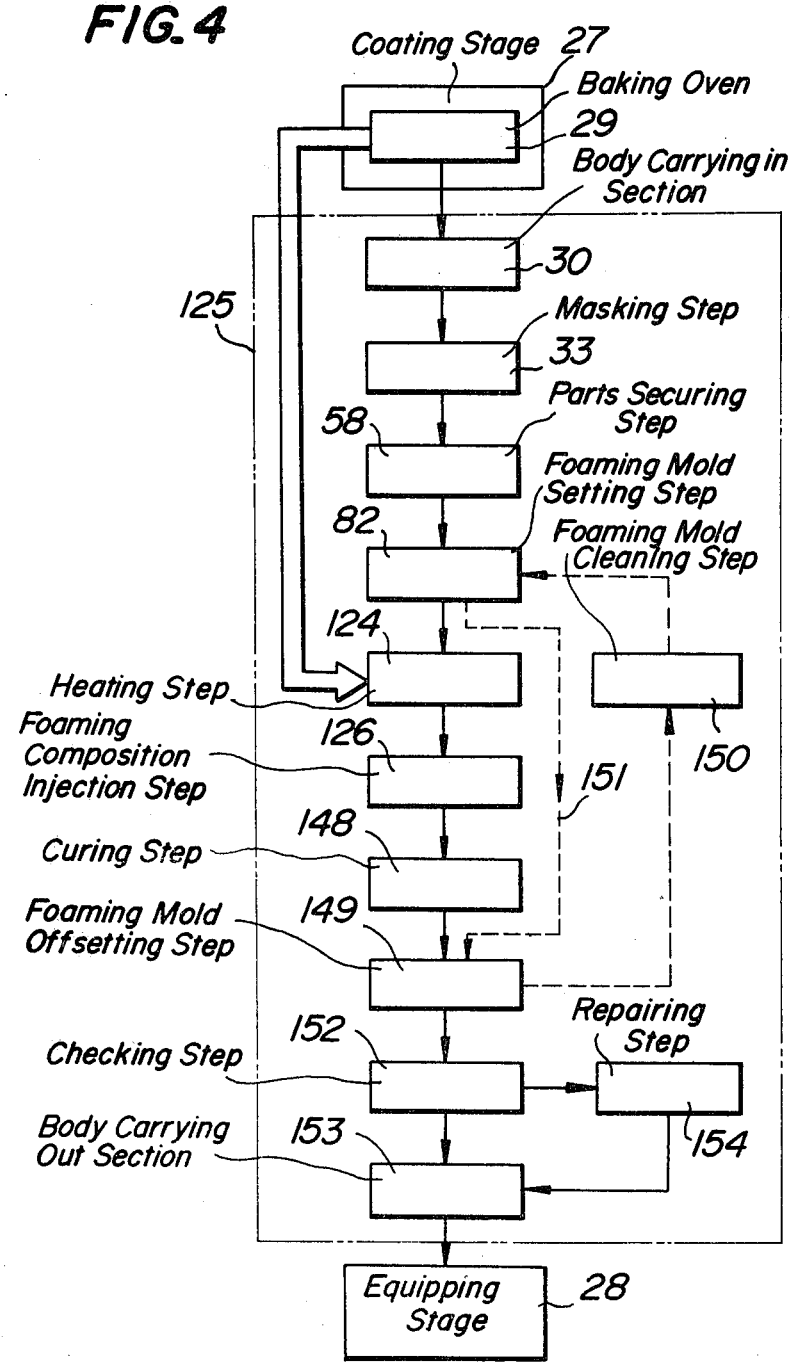

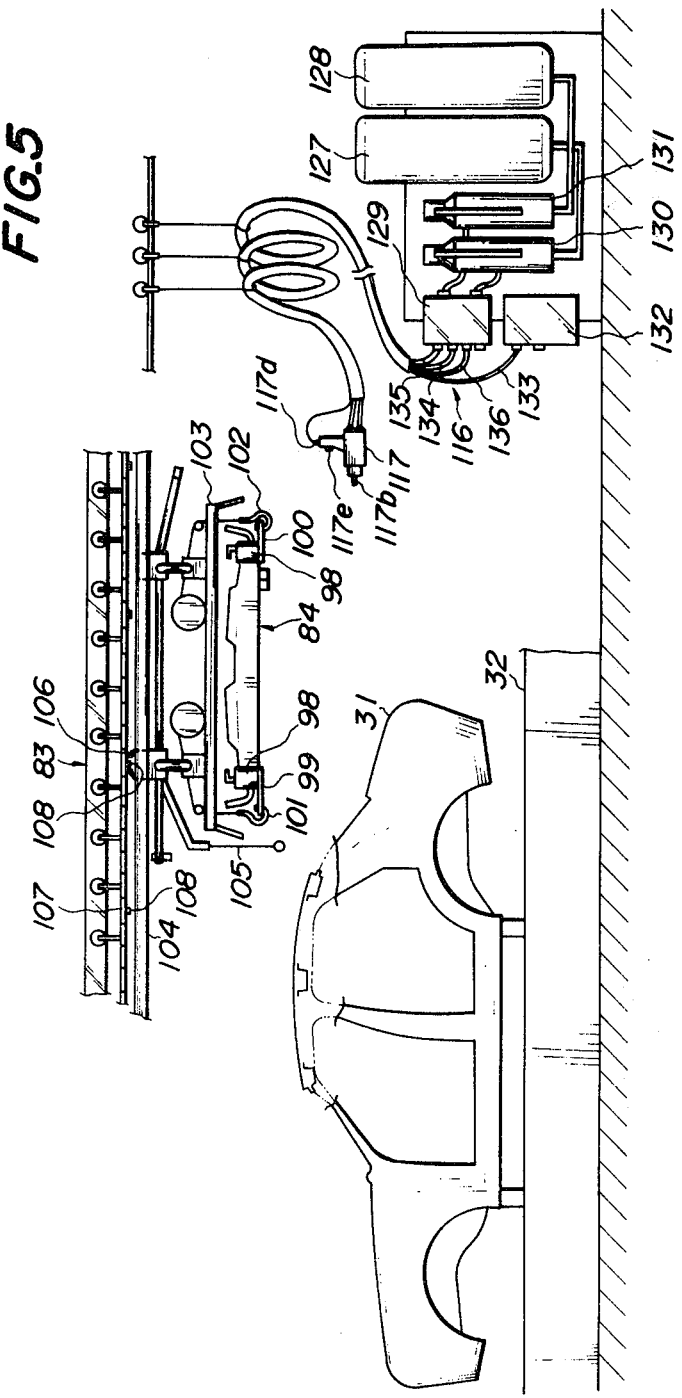

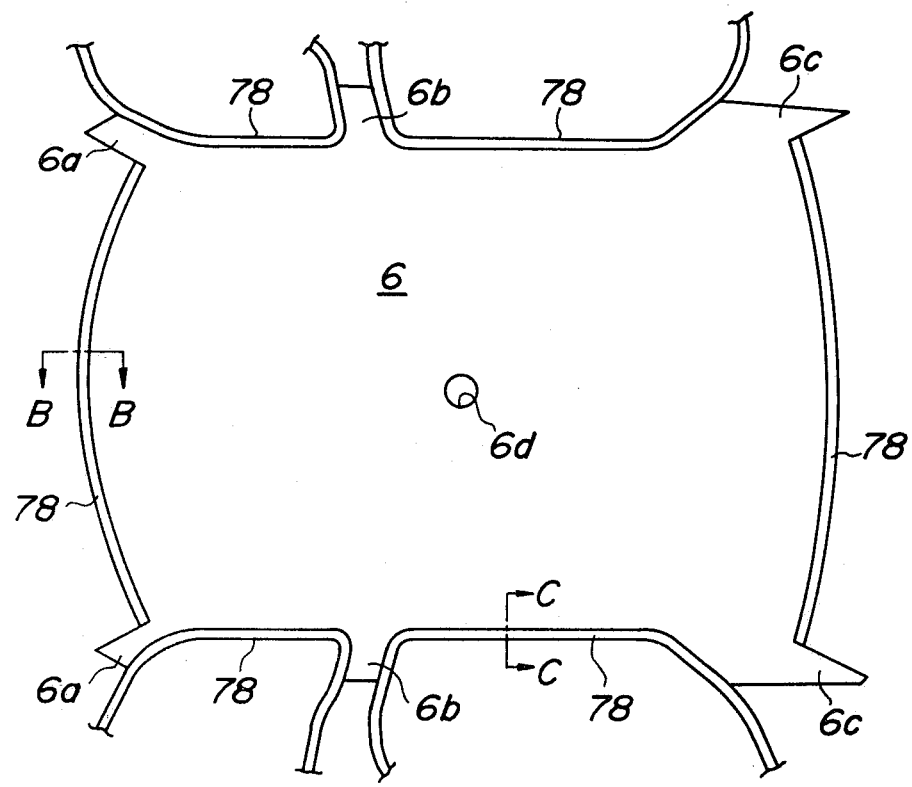
FIG_6a
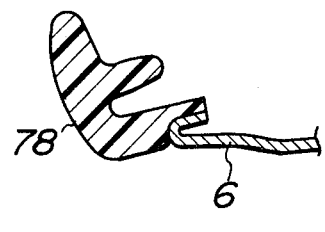
FIG_6b
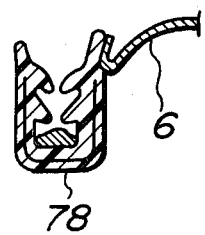
FIG_6c

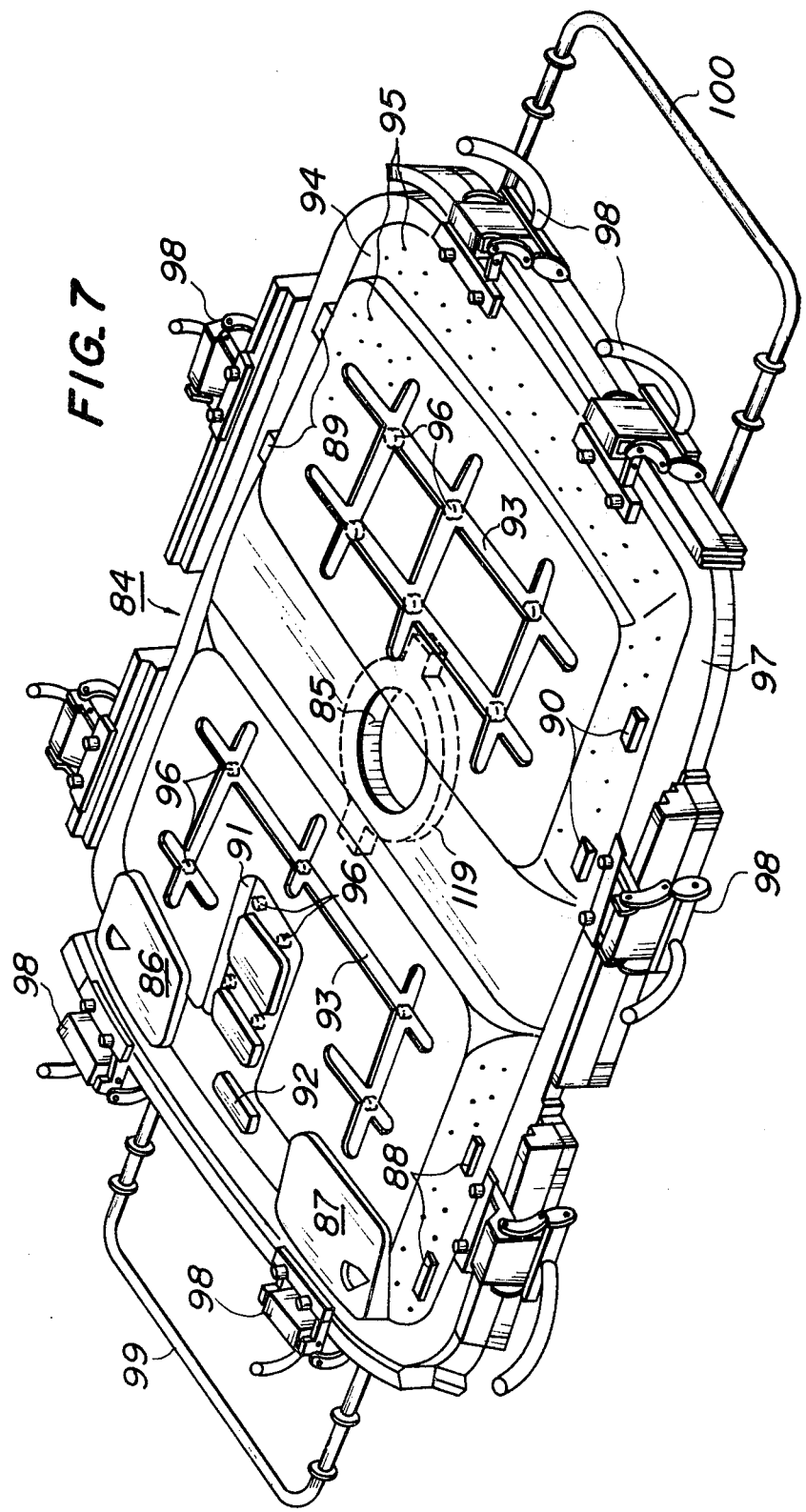

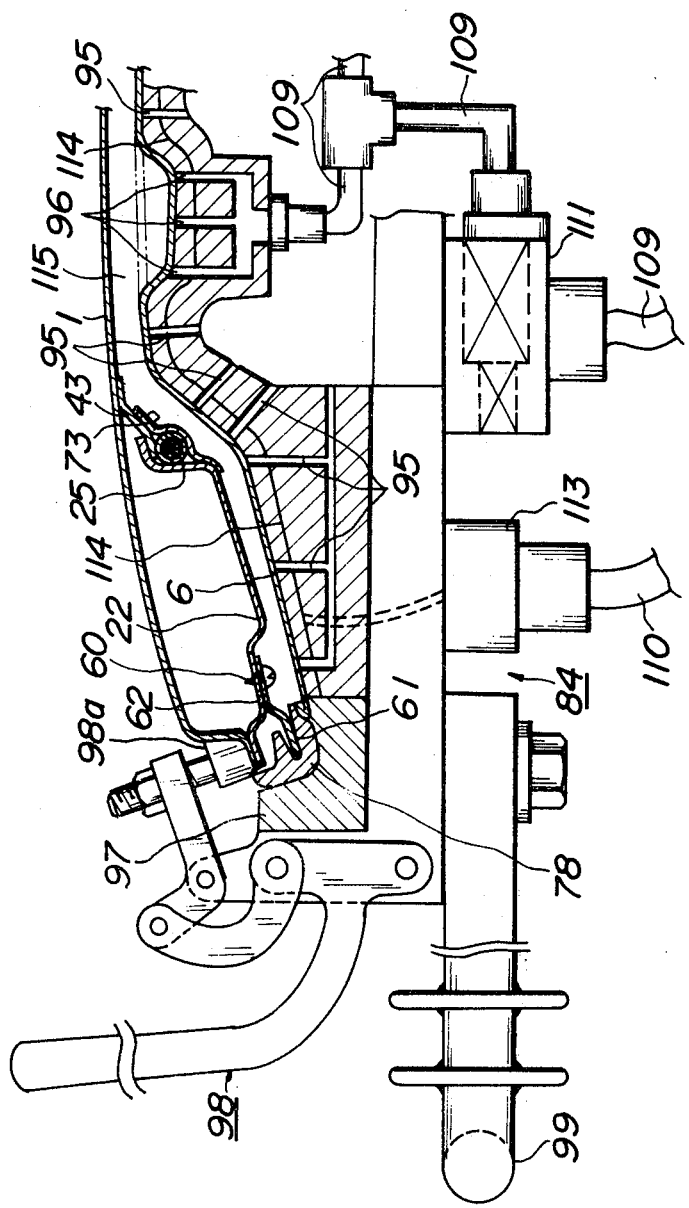

FIG_10a
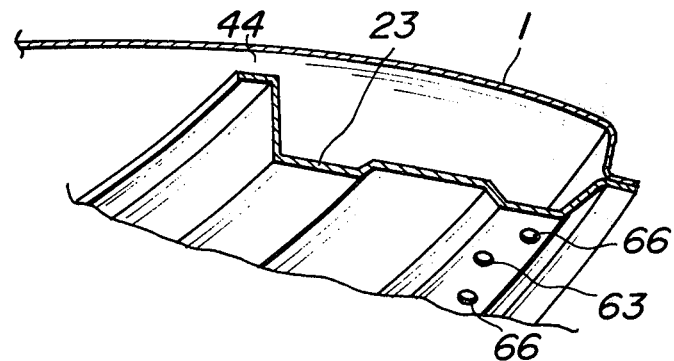
FIG_10b
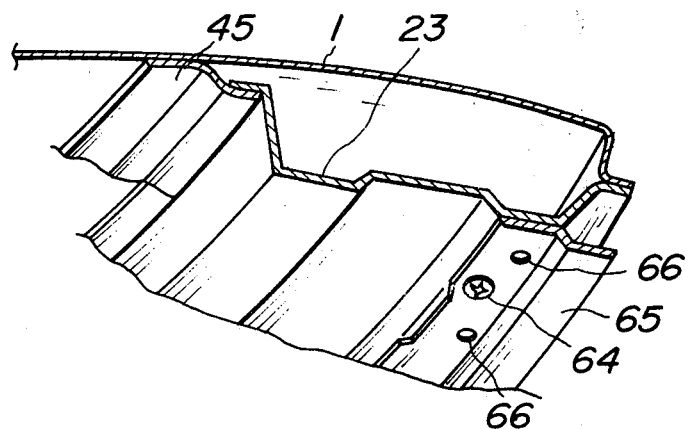
FIG_10c
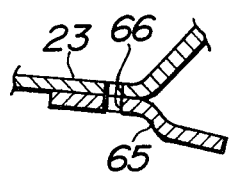
FIG_10d
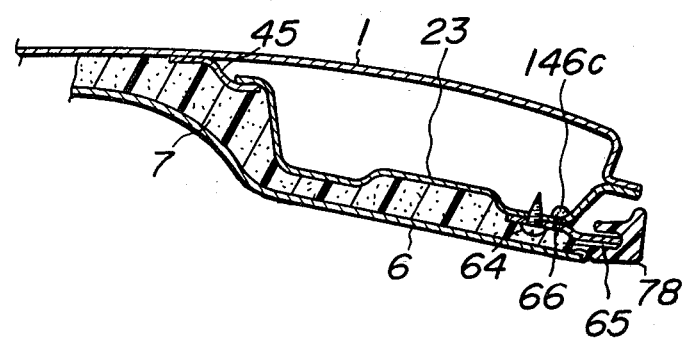

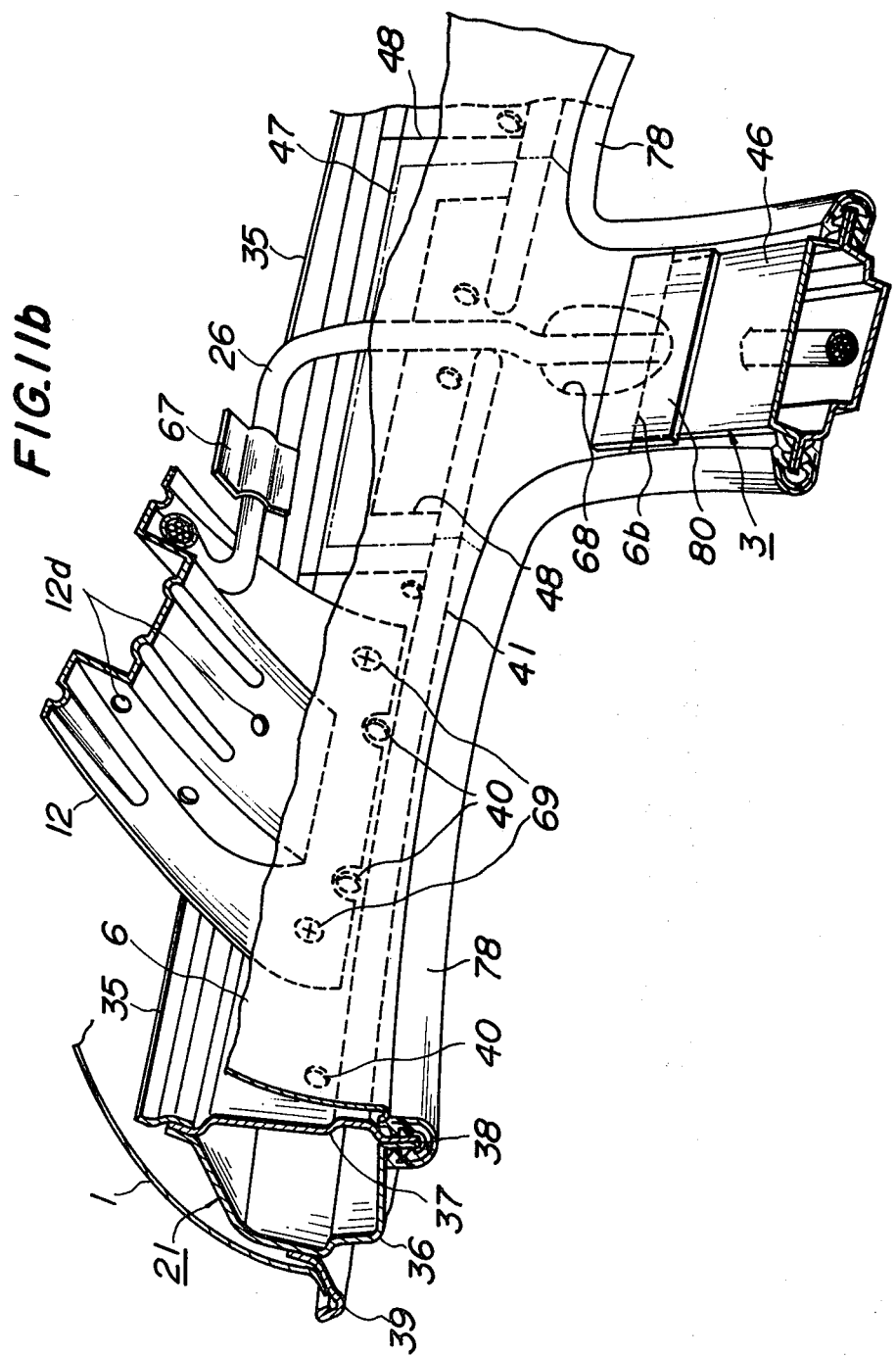

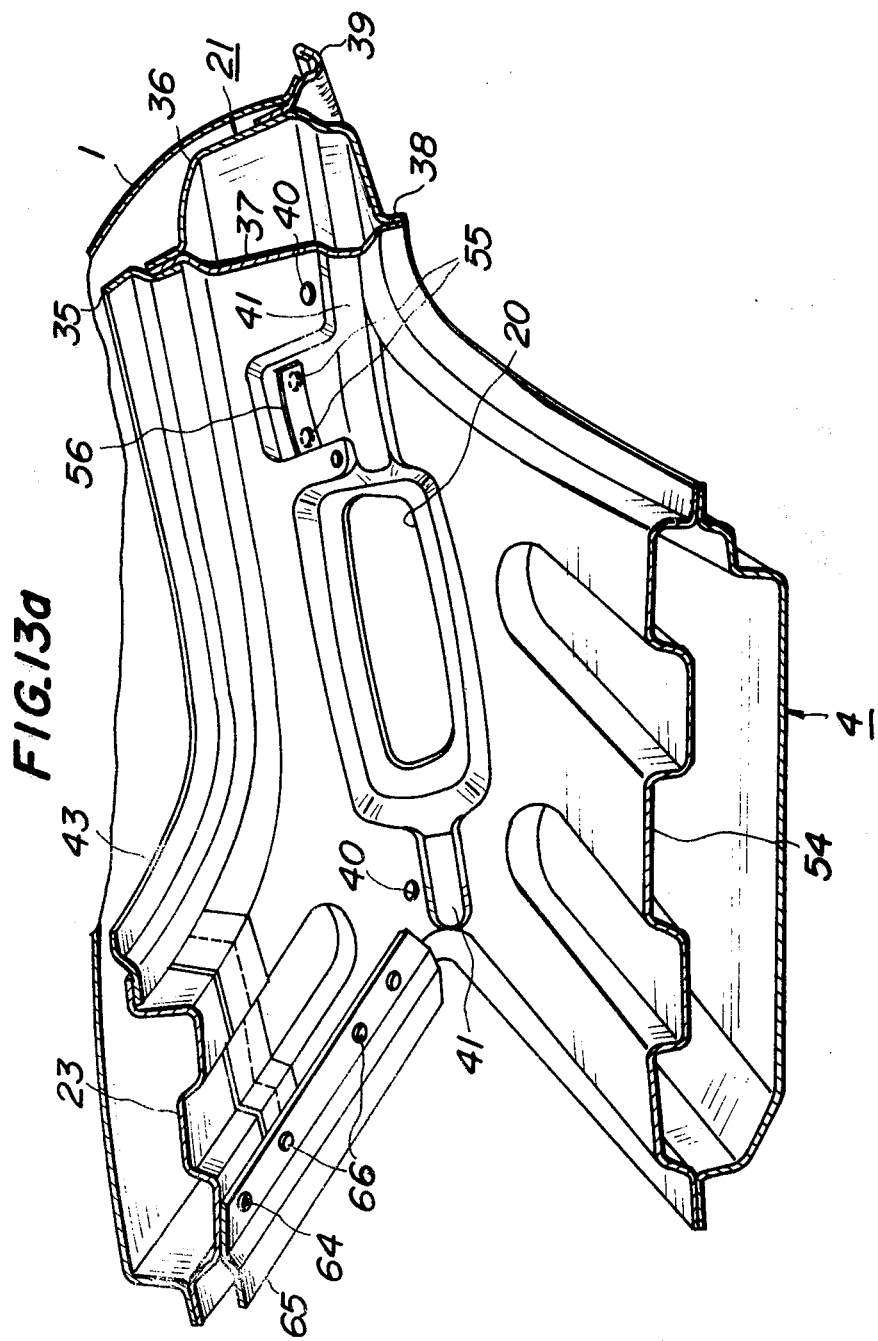

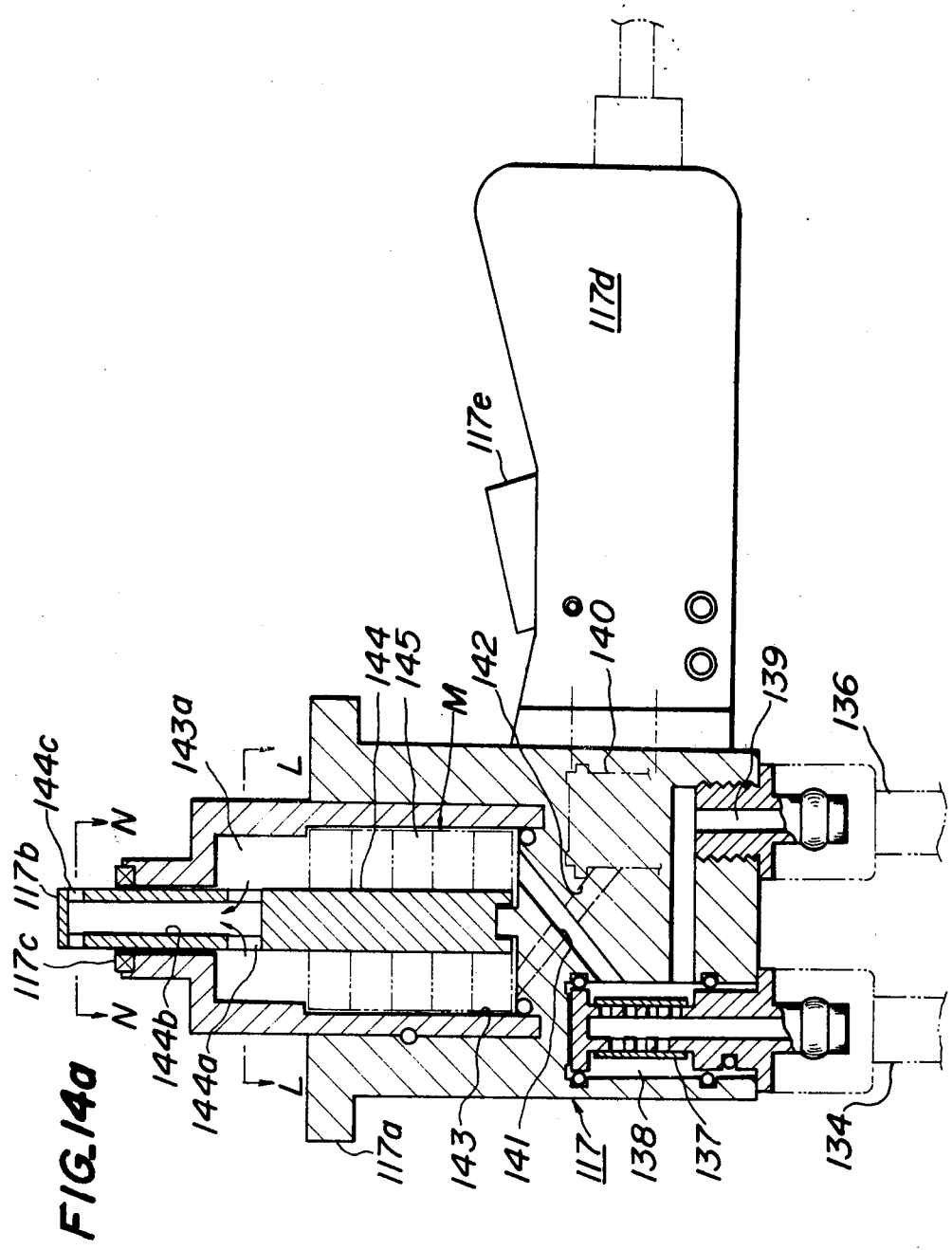

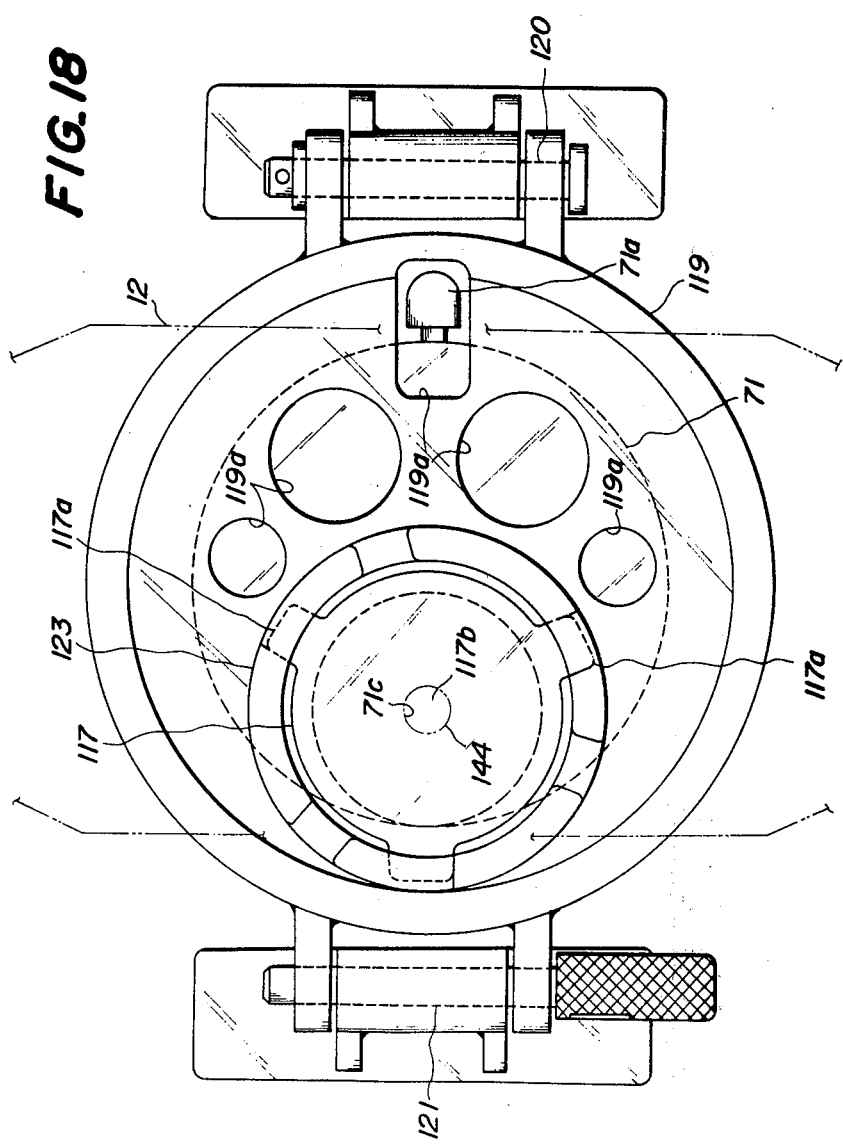

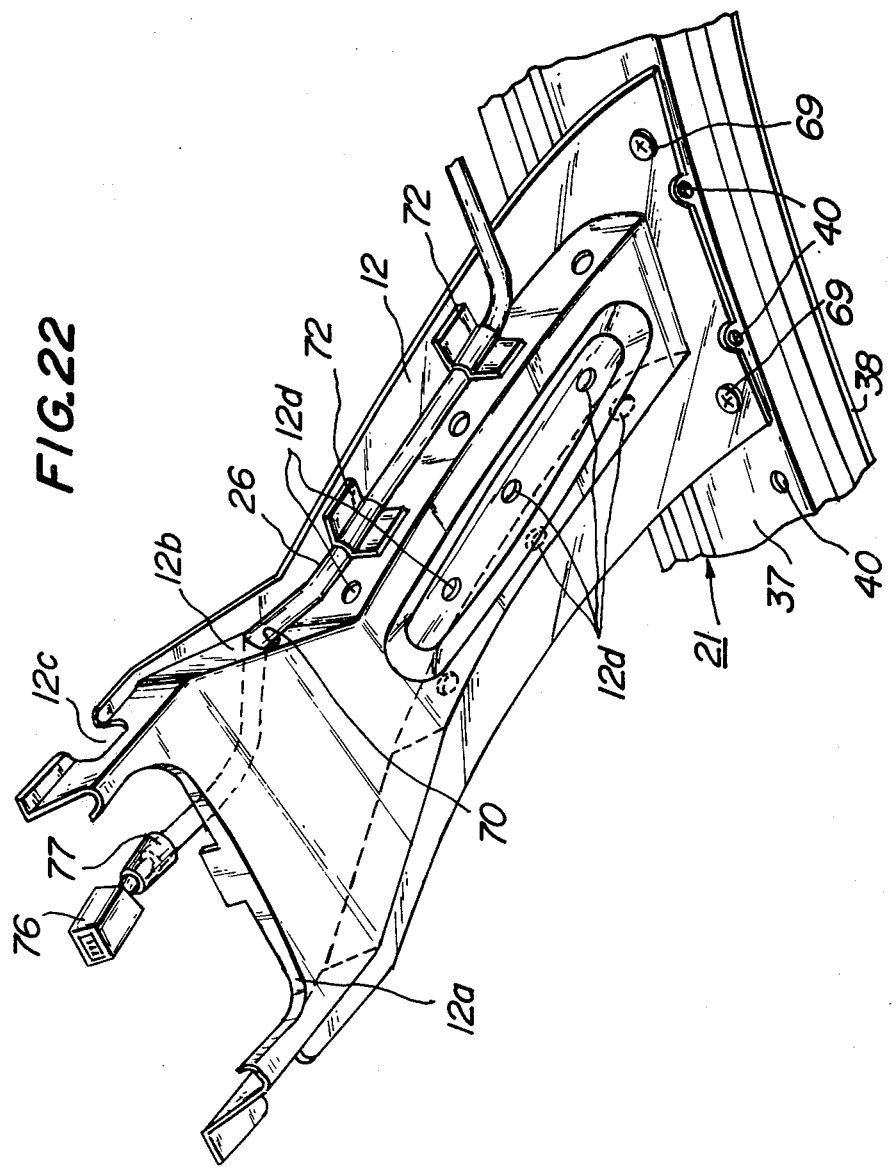

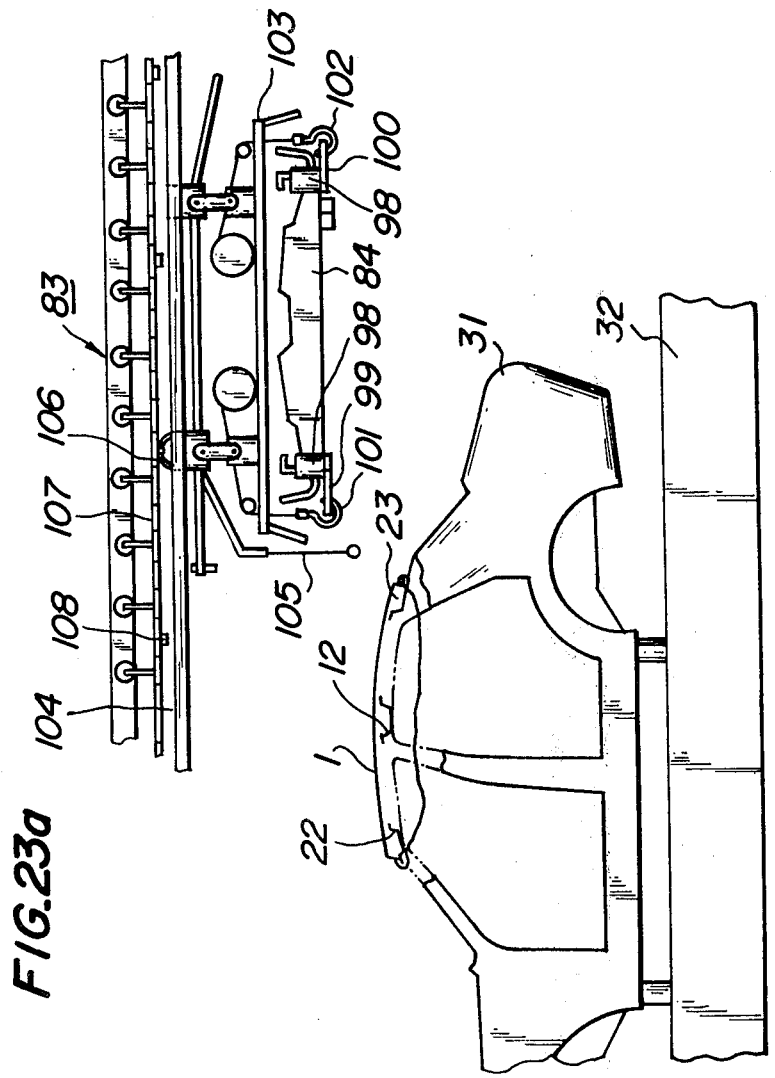

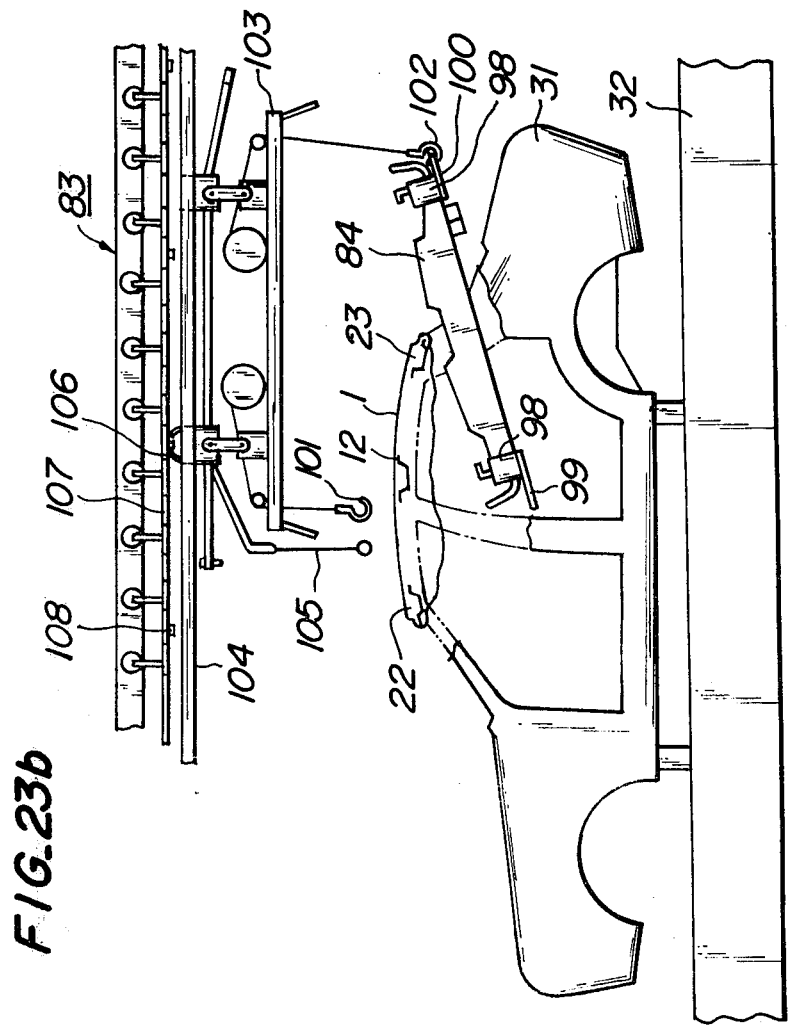

METHOD OF MANUFACTURING A CEILING STRUCTURE OF A VEHICLE

This is a division of application Ser. No. 107,530, filed Dec. 27, 1979, now abandoned.

BACKGROUND OF THE INVENTION

The present invention relates to a method of manufacturing a ceiling structure of a vehicle.

Heretofore, a so-called suspended ceiling has been used as a roof for vehicles. However, this ceiling is extremely difficult to assemble on an equipment line. In order to solve this problem, a formed ceiling has been used. This ceiling comprises a lining skin member, a pad and a base plate which are connected to each other and made into one integral body, and this integral body is press-formed into a predetermined shape. This formed ceiling is secured to and mounted on the inside of a roof panel of a vehicle body after shaping by a proper means.

Such formed ceiling, however, is one-sheet shaped article, so that it is difficult to bring into a compartment when assembling the car body. Also, the end treatment of this ceiling is difficult, so that its workability on the equipment line is poor. Moreover, as a base plate, use is commonly made of resin felt or the like, which has poor elasticity, so that its shaped form is limited and its design is restricted. In addition, a laminated structure of a lining skin member, a pad and a base plate increases material cost.

SUMMARY OF THE INVENTION

An object of the present invention is to eliminate the above mentioned disadvantages of the conventional ceiling structure of a vehicle and the manufacturing method thereof.

Another object of the present invention is to provide a ceiling structure of a vehicle and its manufacturing method wherein, rather than using a previously formed ceiling lining member and securing it to the body as in the conventional shaped roof, a lining skin member is arranged in a roof panel of a car body, a foaming composition is injected between the lining skin member and the roof panel, and a ceiling is molded by foaming the foaming composition. This molding can be carried out and the molded ceiling secured to the body simultaneously. Accordingly, the above problems arising in case of using a shaped ceiling can be solved at once.

According to the present invention, a ceiling structure of a vehicle comprises a roof panel for a car body, a ceiling lining skin member provided at the inner side of the roof panel, and a foamed material filled in a space between the roof panel and the lining skin member.

The ceiling lining skin member is a thermoplastic resin sheet.

The foamed material is made by foaming urethane composition.

A method of manufacturing a ceiling structure of a vehicle according to the present invention comprises a masking step of closing by masking tapes a gap formed between a roof rail member provided at the inner periphery of a roof panel and the roof panel, a linear joint portion between the roof rail and pillar inner panels, and holes for securing parts provided on the roof rail or the like in case of assembling the ceiling having a ceiling lining skin member at the inner side of the roof panel for the car body; a step of securing parts by arranging a wire harness assembly at predetermined position and securing and fitting welts provided around the periphery of the lining skin member to the roof panel; a foaming mold setting step of mounting a foaming mold having the same shape as a final shape of the lining skin member from a compartment of the vehicle; a heating step of preheating the whole ceiling portion to a predetermined temperature; a foaming composition injecting step of injecting a foaming composition into a space formed between the roof panel and the lining skin member; and a foaming mold offsetting step of removing the foaming mold after foaming.

A roof rail member is provided at whole periphery of the roof panel thereby to reinforce the roof panel and to seal a space between the roof panel and the lining skin member.

BRIEF DESCRIPTION OF THE DRAWING

FIG. 4 is a schematic diagram showing steps of the manufacturing method according to the present invention;

FIG. 5 is a side view showing a stage for carrying out the manufacturing method according to the present invention;

FIG. 6a is an enlarged view of a ceiling lining skin member used in a ceiling structure according to the present invention;

FIG. 6b is a cross-sectional view taken along the line B—B of FIG. 6a;

FIG. 6c is a cross-sectional view taken along the line C—C of FIG. 6a;

FIG. 7 is a perspective view of a foaming mold used for carrying out the manufacturing method according to the present invention;

FIGS. 9a to 9f are explanatory views showing the steps for carrying out the manufacturing method according to the present invention with respect to the front roof rail portion shown in cross section on the line E—E of FIG. 3;

FIGS. 10a to 10d are explanatory views showing the steps for carrying out the manufacturing method according to the present invention with respect to the rear roof rail portion shown in cross section on the line F—F of FIG. 3;

FIGS. 11a and 11b are explanatory views showing the steps for carrying out the manufacturing method according to the present invention with respect to the center pillar portion viewed in the direction of an arrow G shown in FIG. 3;

FIGS. 13a to 13f are explanatory views showing the steps for carrying out the manufacturing method according to the present invention with respect to the rear pillar viewed in the direction of an arrow I shown in FIG. 3;

FIGS. 14a to 14e are explanatory views showing a mixing head of a foaming composition injecting device;

FIG. 18 is a bottom view showing the state of securing the mixing head to the forming mold;

FIG. 22 is a perspective view showing the roof bow; and

FIGS. 23a to 23f are side views for explaining a setting step and an offsetting step of the foaming mold.

DESCRIPTION OF THE PREFERRED EMBODIMENT

Figure 1:
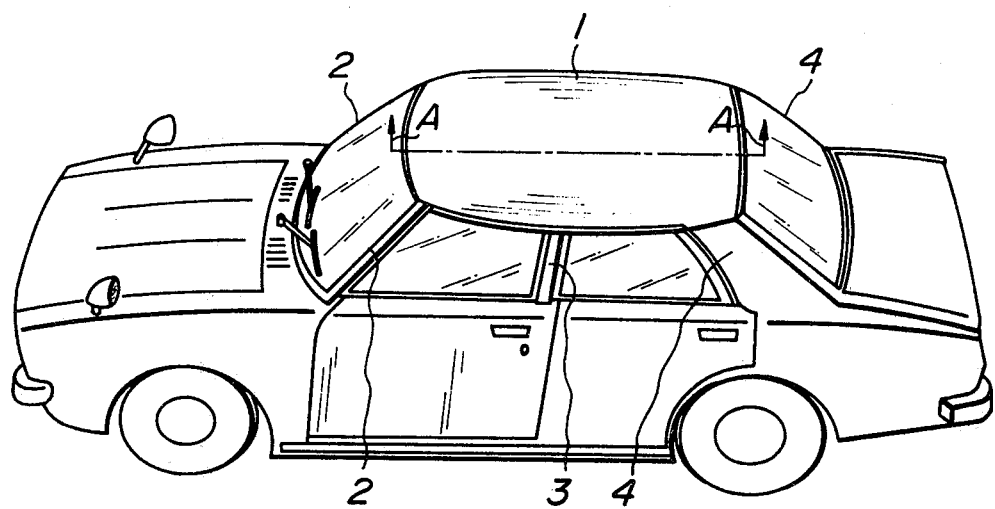
FIG. 1 is a perspective view showing an automobile having a ceiling lining member manufactured by a method according to the present invention.

Referring now to the drawings, wherein like reference characters designate similar or corresponding elements throughout the several views, there is shown a method of manufacturing a roof structure of a vehicle according to the present invention.

Figure 2:
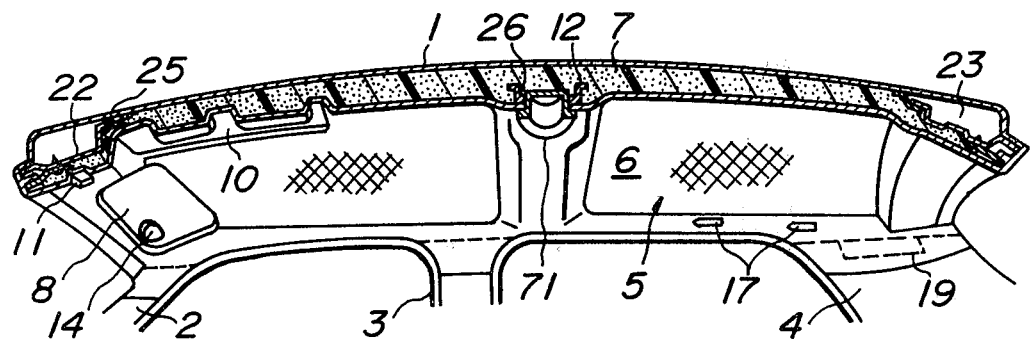
FIG. 2 is a cross-sectional view taken along the line A—A of FIG. 1.
Figure 3:
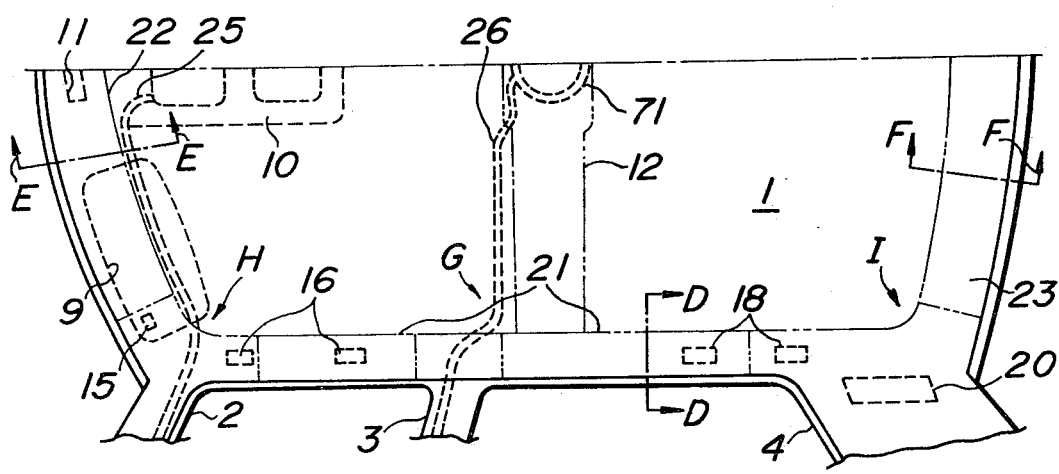
FIG. 3 is a plan view showing a ceiling portion of the automobile shown in FIG. 1.

FIG. 1 shows the whole of a vehicle such as an automobile having a ceiling structure according to the present invention, in which reference numeral 1 is a roof panel of the vehicle body, numeral 2 a front pillar, numeral 3 a center pillar and numeral 4 is a rear pillar of the body. The vehicle has a ceiling structure 5 as shown in FIG. 2 on the inner side of the roof panel 1. The roof structure 5 comprises a ceiling lining skin member 6 faced to a compartment and a foamed material 7 interposed between the lining skin member and the roof panel 1. The detailed structure of the roof structure will be explained hereinafter with reference to FIG. 3. The ceiling structure 5 further comprises a recess 8 for accommodating a sun visor for a driver's seat, a recess 9 for accommodating a sun visor for a driver's side seat, a recess 10 for securing an overhead console, a recess 11 for receiving the securing portion of a rear view mirror and the like. In FIGS. 2 and 3, reference numeral 12 is a roof bow acting as both a reinforcing beam of the roof panel 1 and the securing portion of a room lamp 71, numerals 14, 15 securing portions for a sun visor, numeral 16 the securing portion for an assist grip of the driver's side seat, numeral 17, 18 the securing portions for an assist grip of a rear seat, numerals 19, 20 holes for ventilation, numeral 21 a side roof rail, numeral 22 a front roof rail, numeral 23 a rear roof rail, numeral 25 a harness for the overhead console, and numeral 26 is a harness for the room lamp.

Figure 8A:
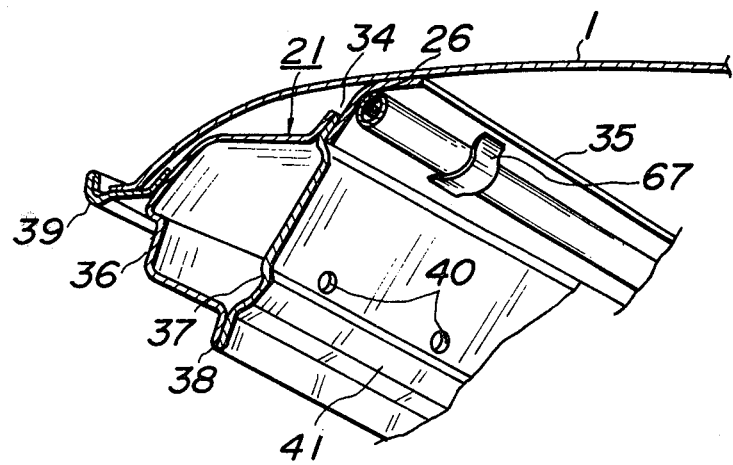
FIGS. 8a to 8d are explanatory views showing steps for carrying out the manufacturing method according to the present invention with respect to the side roof rail portion shown in cross section on the line D—D of FIG. 3.
Figure 9A:
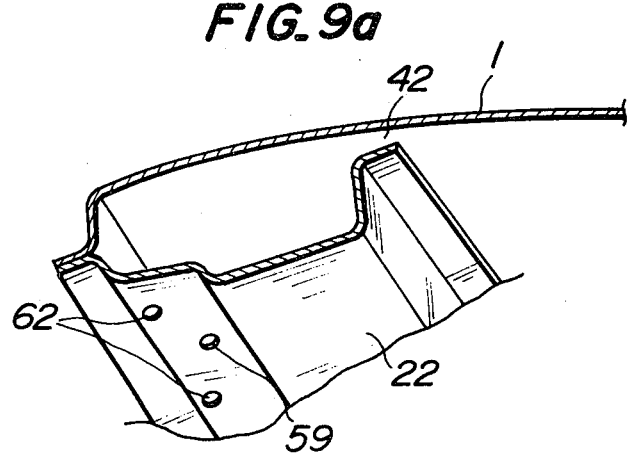
Figure 9B:
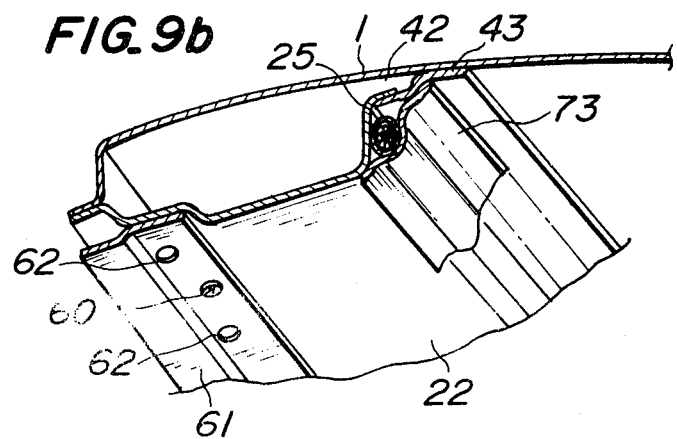
Figure 9C:
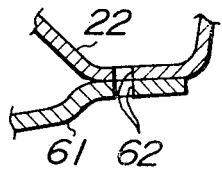

The above ceiling structure 5 according to the present invention is molded and manufactured by steps shown in FIG. 4. These steps are, for example, performed between a coating stage 27 and an equipping stage 28 in an assembly line of a vehicle. The car body coated at the coating stage 27 is conveyed to a ceiling forming step surrounded by two-dot-lines after passed through baking oven 29. FIG. 5 shows the whole of the ceiling forming step. The coated body is conveyed by a body conveyor 32 on which a coated body 31 is put as shown in FIG. 5, so as to keep the body 31 on this stage for the time required for forming a ceiling The coated body 31 is conveyed to a body carrying-in section 30 shown in FIG. 4 is subjected to a masking work in a masking step 33 shown in FIG. 4. This masking step is to close gaps and holes for preventing the foamed material 7 (see FIG. 2) from leaking through the gaps and holes (which will be explained later on) of the body during the foaming operation. This masking step closes a gap 34 between the roof panel 1 and the side roof rail 21 with a masking tape 35 as shown in FIG. 8a. The side roof rail 21 is provided with a flange portion 38 made by integrally connecting an outer panel 36 with an inner panel 37 as usual and attached to the roof panel 1 through a roof drip 39, and the inner panel 37 are provided with air escaping holes 40 and a sealing bead 41 necessary for carrying out the invention all over the periphery of the ceiling. As shown in FIG. 9a, the front roof rail 22 is attached to the front edge of the roof panel 1, so as to produce a gap 42 between these roof panel 1 and front roof rail 22. This gap is closed by a masking tape 43 as shown in FIG. 9b. As shown in FIG. 10a, a gap 44 between the roof panel 1 and the rear roof rail 23 attached to the rear edge thereof is closed by a masking tape 45 as shown in FIG. 10b.

Figure 11A:
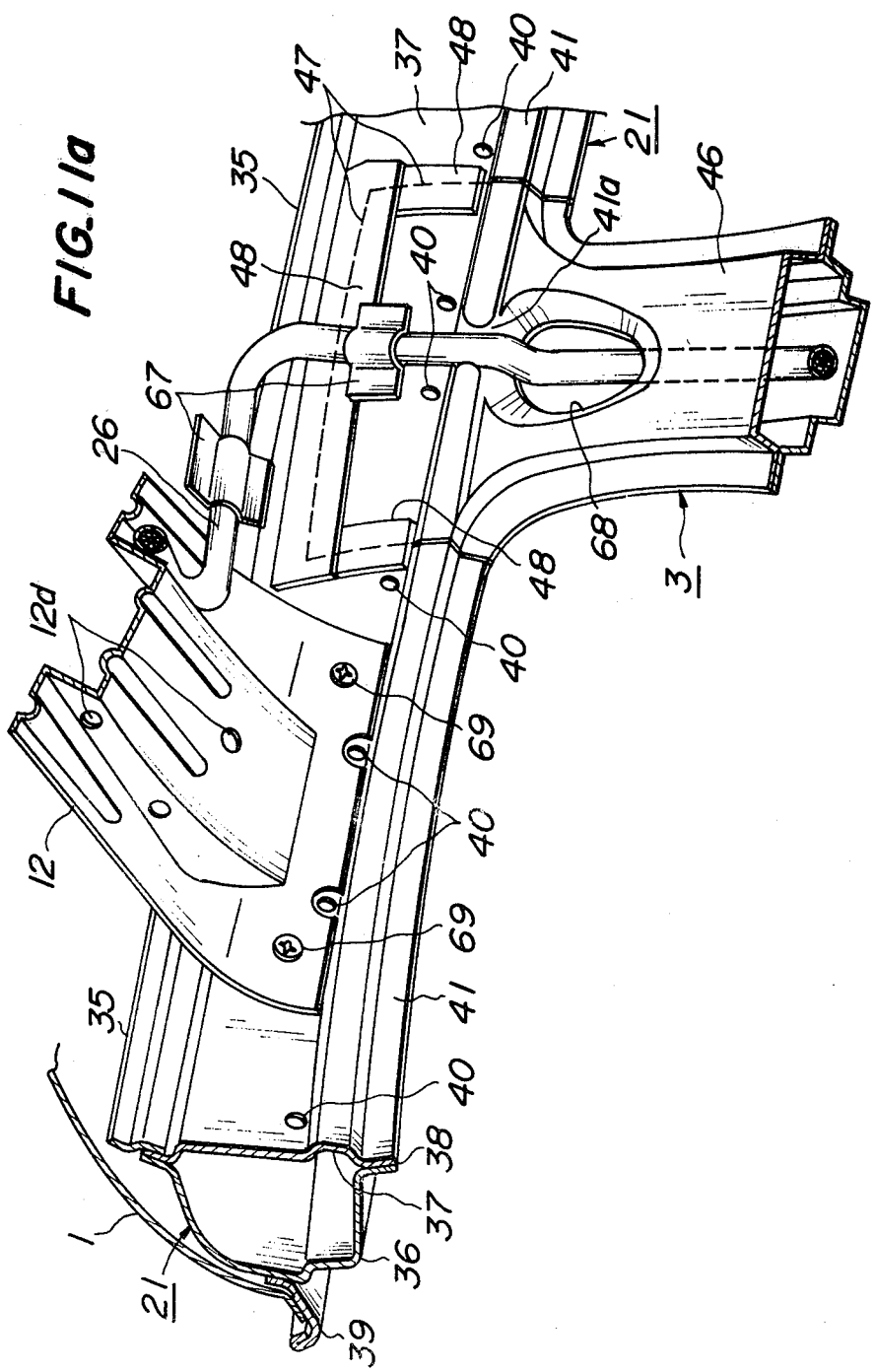
Figure 12A:
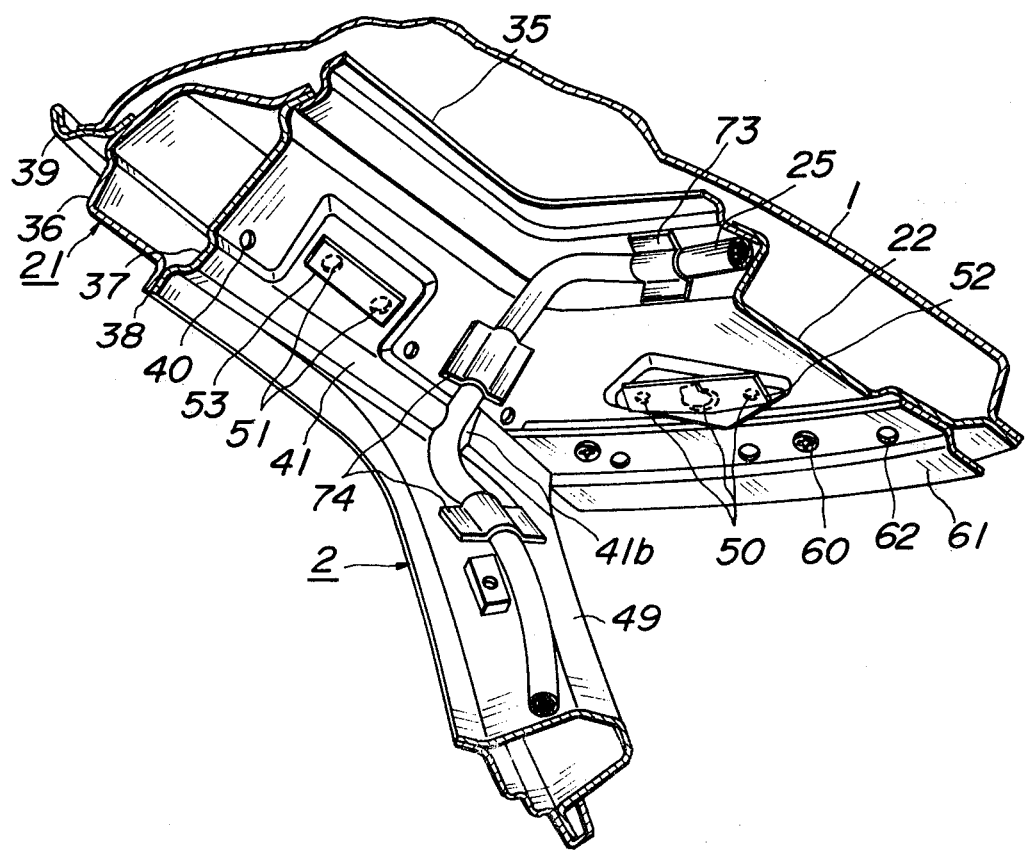
FIGS. 12a and 12b are explanatory views showing the steps for carrying out the manufacturing method according to the present invention with respect to the front pillar viewed in the direction of an arrow H shown in FIG. 3.
Figure 13B:
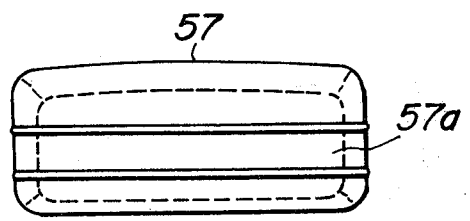
Figure 13C:
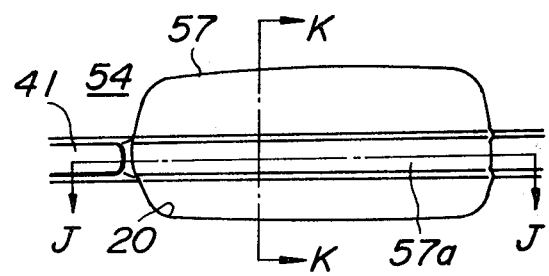
Figure 13D:
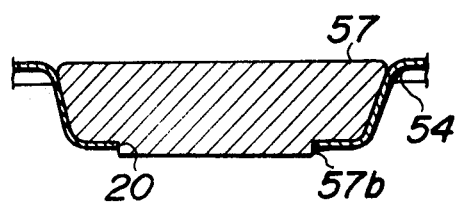
Figure 13E:
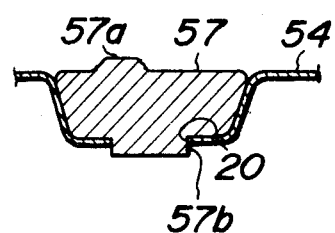
Figure 13F:
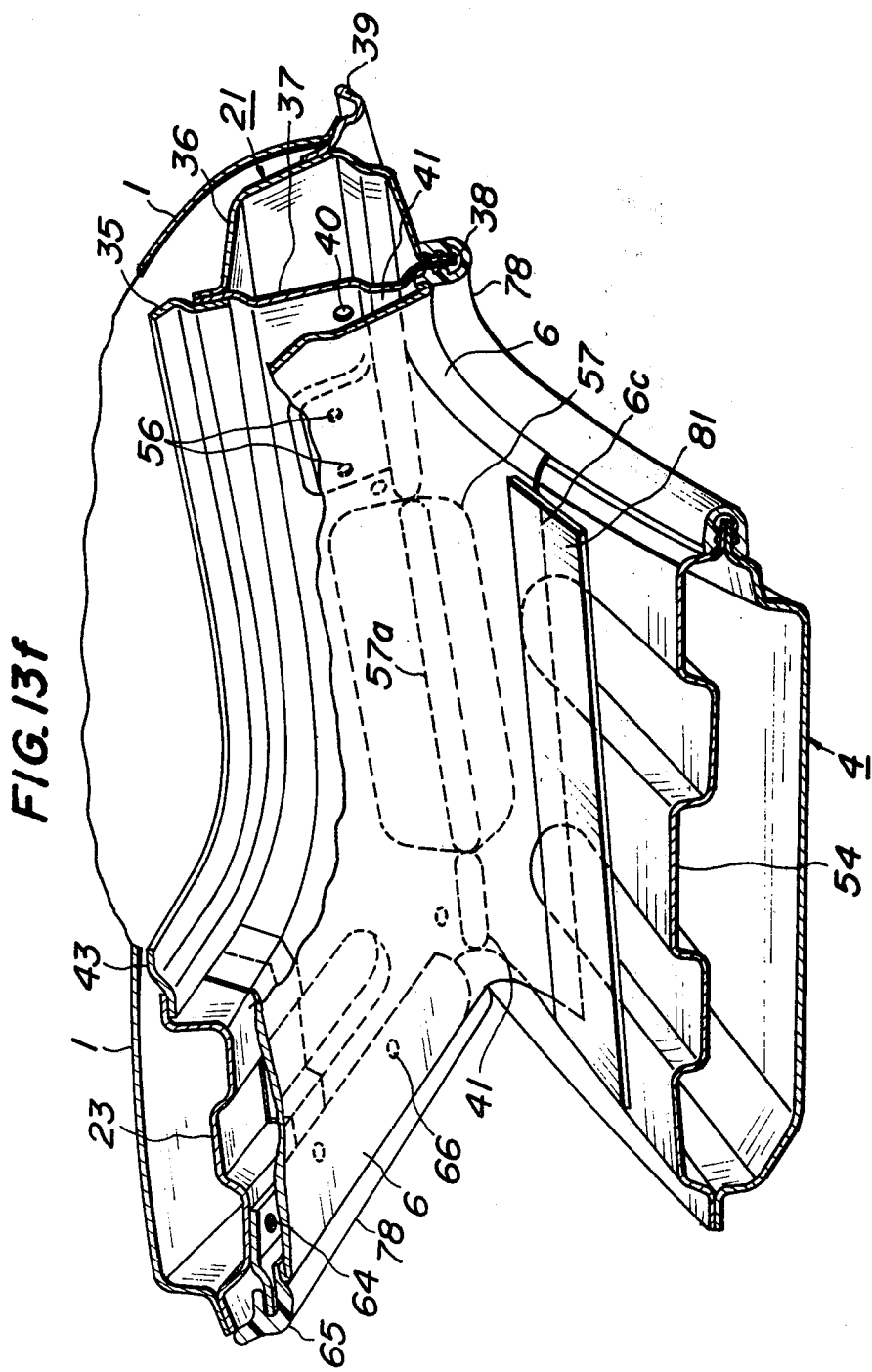

As shown in FIG. 11a, a linear joint 47 between an inner panel 46 of the center pillar 3 and the inner panel 37 of the side roof rail 21 is closed by a masking tape 48, while as shown in FIG. 12a, holes 50, 51 for securing a sun visor and an assist grip for a driver's side seat provided in an inner panel 49 of the front pillar 2 are closed by masking tapes 52, 53, respectively, and a hole 55 for securing an assist grip for a rear seat provided in an inner panel 54 of the rear pillar 4 is closed by a masking tape 56 as shown in FIG. 13a. In addition, other securing holes (not shown), for example, the securing holes provided in the front roof rail 22 at the securing portion 11 for a rear view mirror and at the securing portion 14 for a sun visor of a driver's seat and assit grip securing holes (corresponding to the securing portions 16-18 in FIGS. 2 and 3) provided in the inner panel 37 (see FIG. 8) of the side roof rail 21 are also closed by masking tapes, respectively. The inner panel 54 of the rear pillar 4 is also provided with the hole 20 for ventilation as shown in FIG. 13a, and this hole is also closed in the masking step. To this end, a masking block 57 is used as shown in FIG. 13b as a whole. The masking block 57 is formed by molding permeable material such as soft urethane foaming material or the like into the same shape as the hole 20 for ventilation and this block 57 is secured as described above. The rear roof rail 23 and retainer 65 are provided with a number of air holes 66 which extend along the longitudinal direction of a retainer 61 as shown in FIG. 10c.

Figure 15:
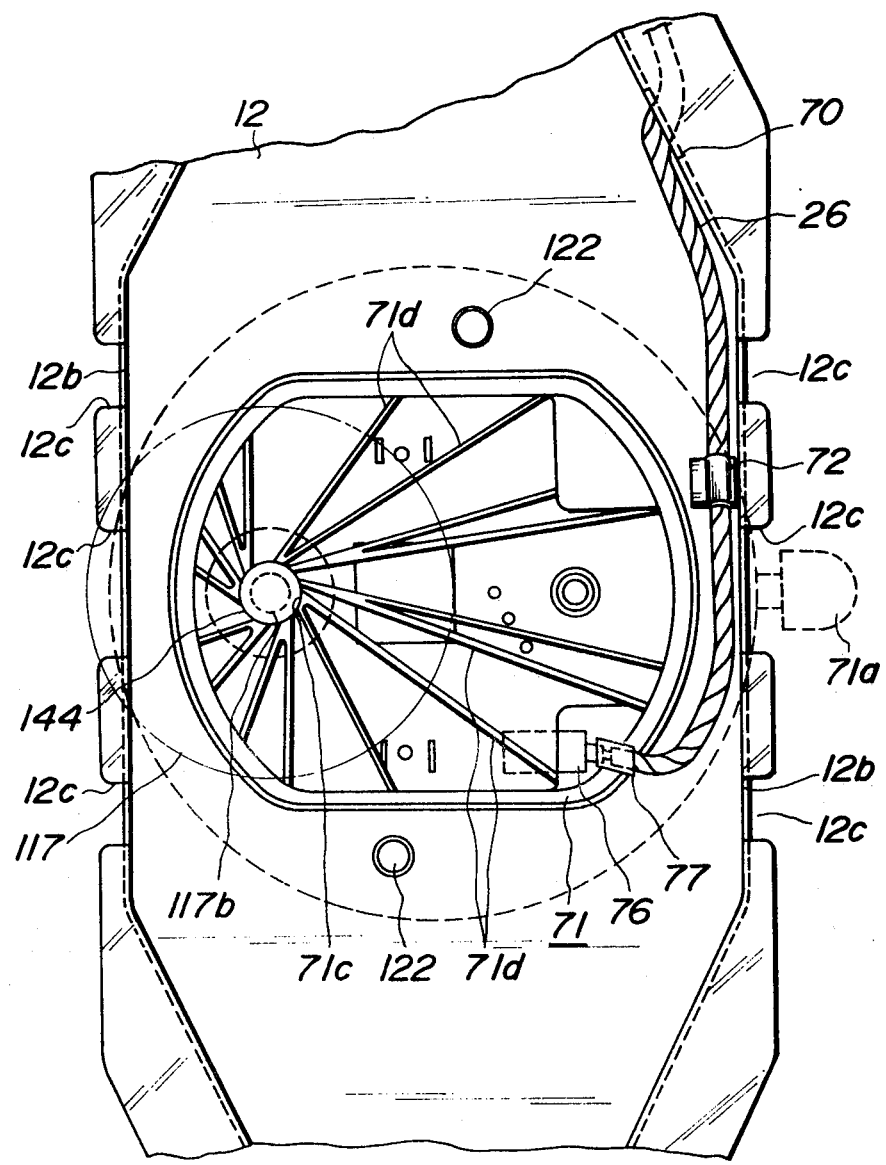
FIG. 15 is a plan view showing a room lamp secured to a roof bow viewed from the roof panel side.
Figure 17:
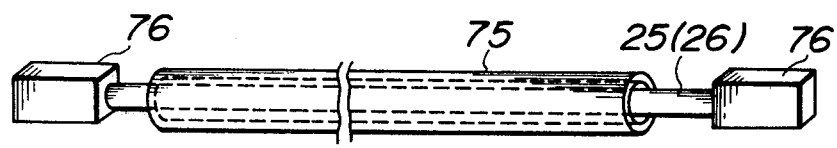
FIG. 17 is a perspective view showing a harness arranged between connectors.

As shown in FIG. 8a, the harness 26 for a room lamp is arranged along the masking tape 35 and the harness is secured by clamp tapes 67 at several places. One end of the harness 26 extends downwardly to the center pillar 3 as shown in FIG. 11a, and is inserted into the center pillar 3 through an opening 68 formed in the inner panel 46 so as to reach an electric supply source portion. The other end of the harness is arranged along the lower surface of the roof bow 12 interposed between the both side inner panel portions 37 of the side roof rail by means of a screw 69, and further arranged along the upper surface of the roof bow 12 through a hole 70 of the roof bow 12 and secured by a clamp tape 72 as shown in FIGS. 15 and 22 so as to reach a room lamp 71. As shown in FIG. 9b, a harness 25 for an overhead console to be mounted along the roof panel 1 is also arranged along the masking tape 43 and the harness is secured by clamp tapes 73 at several places. One end of the harness 25 is not shown but arranged toward the recess 10 for securing the overhead console as shown in FIG. 2 and the other end thereof is arranged along the front pillar 2 so as to reach the electric supply source as shown in FIG. 12a and secured by clamp tapes 74 at several positions. During assembly of these harnesses 26, 25, the portions of the sealing bead 41 where these harnesses pass through the sealing bead 41 as shown in FIGS. 11a and 12a are cut, and the harnesses pass through these cut portions 41a, 41b. It is also possible to carry out the above assembly by inserting the harnesses 25, 26 into a tube 75 as shown in FIG. 17 so as to and enable the harnesses to be exchanged easily. In this case, it is preferable to prevent the foaming composition from entering the tube 75 by closing the openings at both ends of the tube 75 with, for example, the masking tape 77 as shown in FIG. 22. If a connector 76 is embedded in an injected foaming composition, the harnesses are covered with a masking tape together with the connector.

After the harnesses 25, 26 are arranged in the above manner, the lining skin member 6 (see FIG. 2) is secured. The lining skin member 6 has the shape shown in FIG. 6a before molding. It is formed, for example, by cutting a thermoplastic resin sheet such as vinyl chloride sheet or the like. This lining skin member 6 is provided with a welt 78 around the periphery thereof except tongue members 6a, 6b and 6c laminated on the front pillar 2, the center pillar 3 and the rear pillar 4 (see FIG. 2) and also provided with an opening 6d for a room lamp at the center portion. The welt 78 is formed by continuously extrusion-molding vinyl chloride or the like. The welts in front and in the rear of the body are formed into a cross section as shown in FIG. 6b and the welts on both sides of the body are formed into a cross section as shown in FIG. 6c, respectively. Each welt is cut to a proper length and affixed to the periphery of the lining skin member 6 at corresponding positions.

Figure 8B:
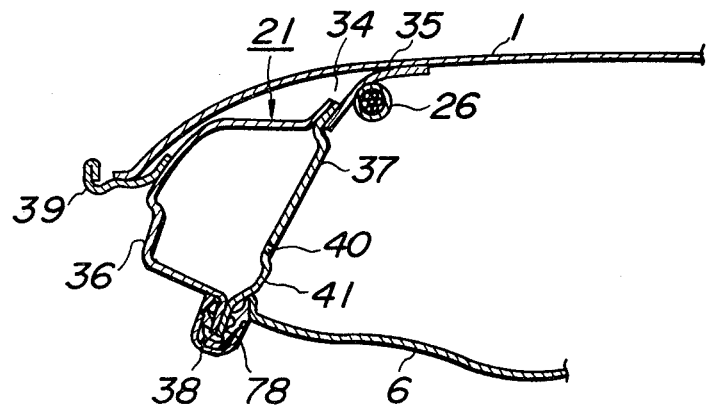
Figure 9D:
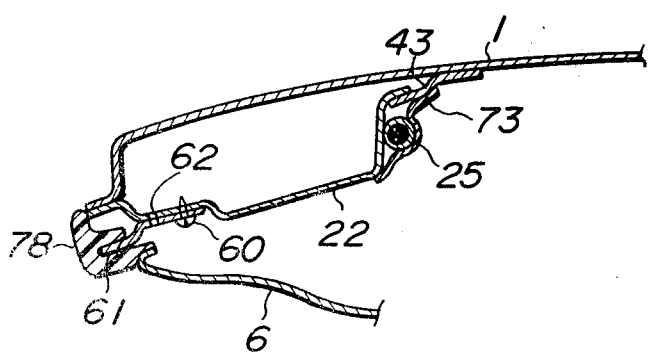
Figure 12B:
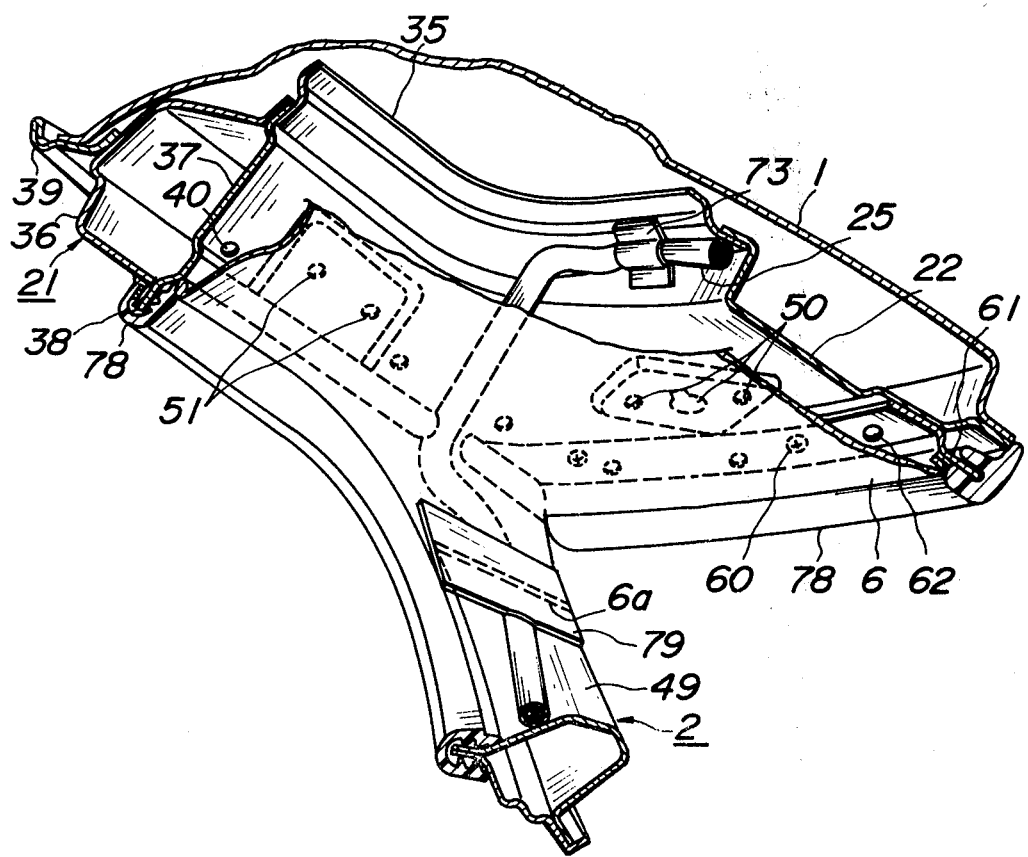

Such lining skin member 6 is secured to the body by inserting the welts on both sides of the body into the flange portion 38 of the side roof rail 21 as shown in FIG. 8b, inserting the welts in front of the body into the retainer 61 as shown in FIG. 9d and inserting the welts in the rear of the body into the retainer 65 as shown in FIG. 10d. In this case, the lining skin member 6 is slackened and hung downward. The tongue members 6a, 6b and 6d laminated on the pillars 2, 3 and 4 of the lining skin member 6 are sealed to the inner surfaces of the pillars 2 to 4 corresponding to the masking tapes 79 to 81 as shown in FIG. 12b, FIG. 11b and FIG. 13i f, respectively.

The parts securing step is completed in the foregoing, and thereafter, at the foaming mold setting step shown by 82 in FIG. 4, a foaming mold 84 conveyed by a common power and free conveyor 83 is set as shown in FIG. 5. This foaming mold 84 has the same shape as final shape of the lining skin member 6 as shown in FIG. 7 and is provided with an opening 85 for securing a room lamp and injecting a foaming composition at the center portion, projections 86, 87 corresponding to the recesses 8, 9 (see FIGS. 2 and 3) for securing a sun visor, projections 88 to 90 corresponding to the portions 16 to 18 for securing an assist grip (see FIGS. 2 and 3), an uneven portion 91 corresponding to the portion 10 for securing an overhead console (see FIGS. 2 and 3), a projection 92 corresponding to the portion 11 for securing a back mirror (see FIGS. 2 and 3) and a recess 93 for shaping a lining skin member. The foaming mold 84 is further provided with a number of air escaping holes 95 all over the mold surface inclusive of an inclined portion 94 at the periphery of the mold surface, and the recesses 91 and 93 are provided with a suction hole 96, which are served for an object explained later on. The whole periphery of the foaming mold 84 is also provided with a continuously extending seal portion 97, a proper number of clamps 98 at suitable intervals and handles 99 and 100 in front end and in the rear end of the foaming mold 84.

Figure 8C:
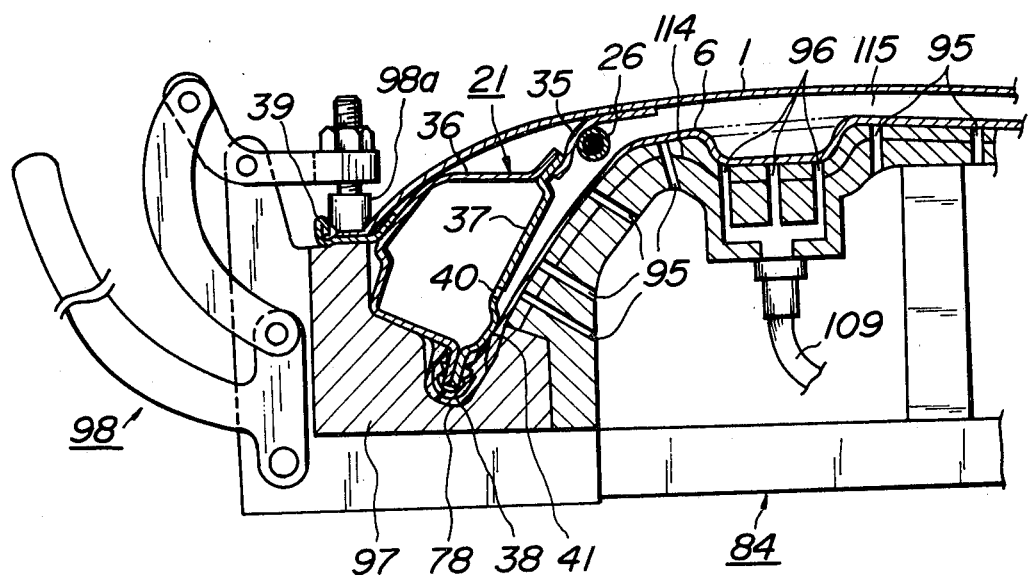
Figure 8D:
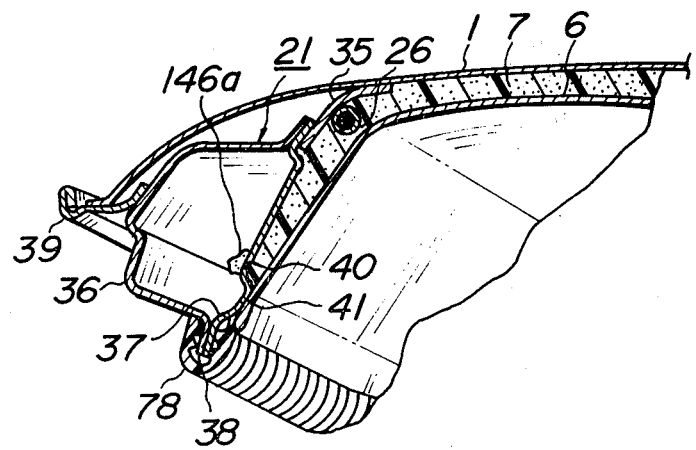
Figure 23C:
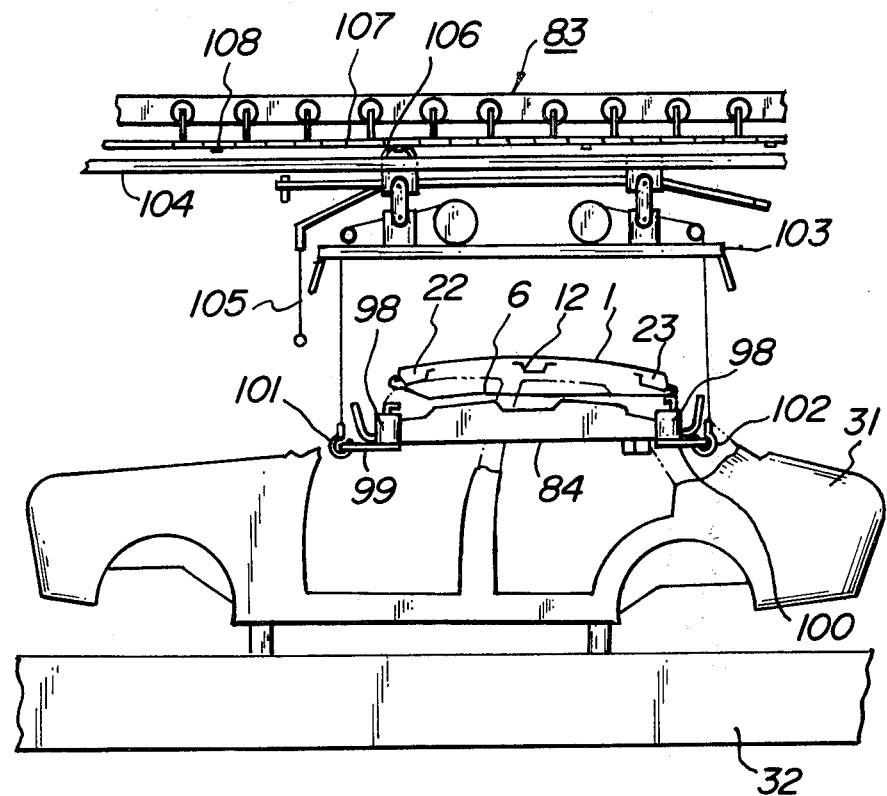

The foaming mold 84 is suspended under a carriage 103 and supported by balance hangers 101 and 102 as shown in FIG. 5. The carriage 103 is suspended under a guide rail 104. The carriage 103 is provided with a control lever 105. When this lever is operated to one direction, a dog 106 is engaged with one of claws 108 suspended from a conveyor 107 always driven to a certain direction, so as to move the carriage 103 and the foaming mold 84 suspended therefrom. In this manner, when the foaming mold 84 is conveyed into the rear of the body 31 as shown in FIG. 5 and FIG. 23a, a worker or an operator releases the carriage 103 from the conveyor 107 by operating the lever 105 and stops it at this position. In this condition, the worker removes the front handle 99 from the hook 101 and inserts the front end of the foaming mold 84 from the rear window portion of the body 31 as shown in FIG. 23b. In this case, the carriage 103 moves along the guide rail 104 as the foaming mold 84 is inserted. After inserting the foaming mold 84, the handle 99 projects from the front window of the body 31 and the handle 99 is engaged with the hook 101 as shown in FIG. 23c. The foaming mold 84 is then raised. In this case, the sealing portion 97 of the foaming mold 84 is made to contact with the welt 78 on the sides of the side roof rail 21 and of the front roof rail 22 as shown in FIGS. 8c and 9e, while the welt 78 (see FIG. 10d) on the side of the rear roof rail 23, which is not shown, is matched with the mold in a state simiar to FIG. 9e, and the sealing portion 97 of the foaming mold 84 further presses the lining skin member 6 to the seal bead 41 of the side roof rail 21 to make a seal as shown in FIG. 8c. When the clamp 98 of the foaming mold 84 is operated, that is, clamps on both sides among these clamps are operated in the direction of an arrow as shown in FIG. 8c, the clamp in the front side is operated in the direction of an arrow as shown in FIG. 9e, the clamp in the rear side is similarly operated as shown in FIG. 9e, which is not shown, and rubber claws 98a of these clamps are engaged with the edge portions of the roof panel corresponding thereto, respectively, the foaming mold 84 is set in a predetermined position.

Figure 23D:
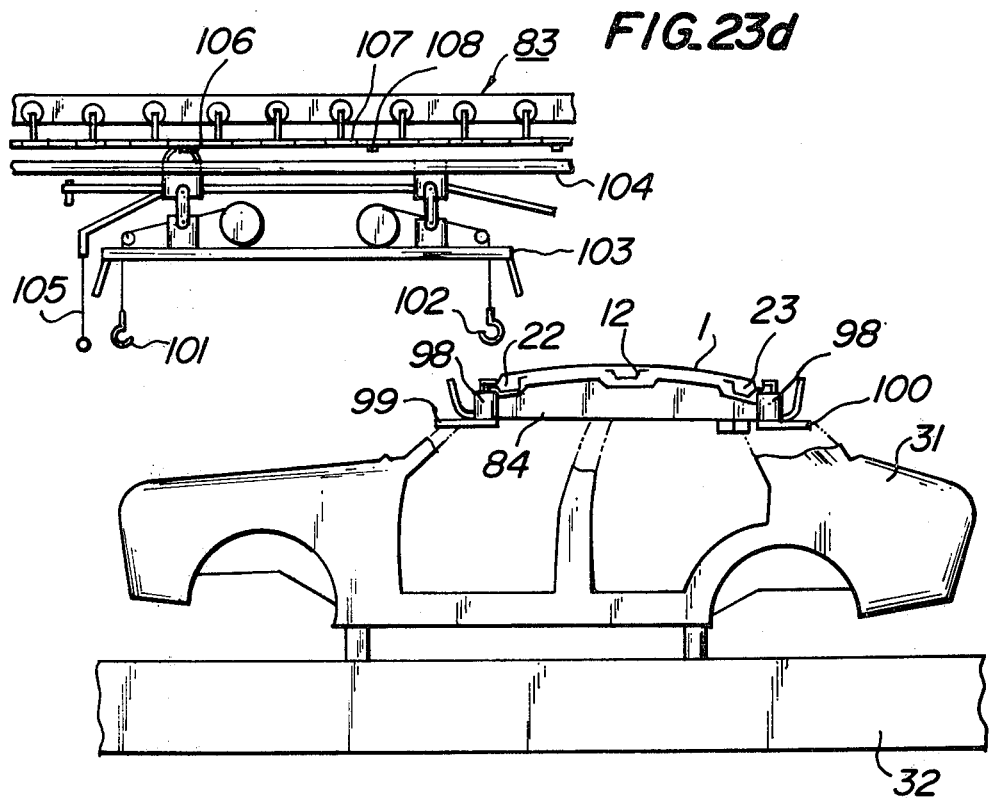

Under this set condition, the hooks 101 and 102 are released from corresponding handles 99 and 100, the carriage 103 is driven and engaged with the conveyor 107 by operating the lever 105 as shown in FIG. 23d, and the carriage 103 is separated as shown in FIG. 5.

Figure 23E:
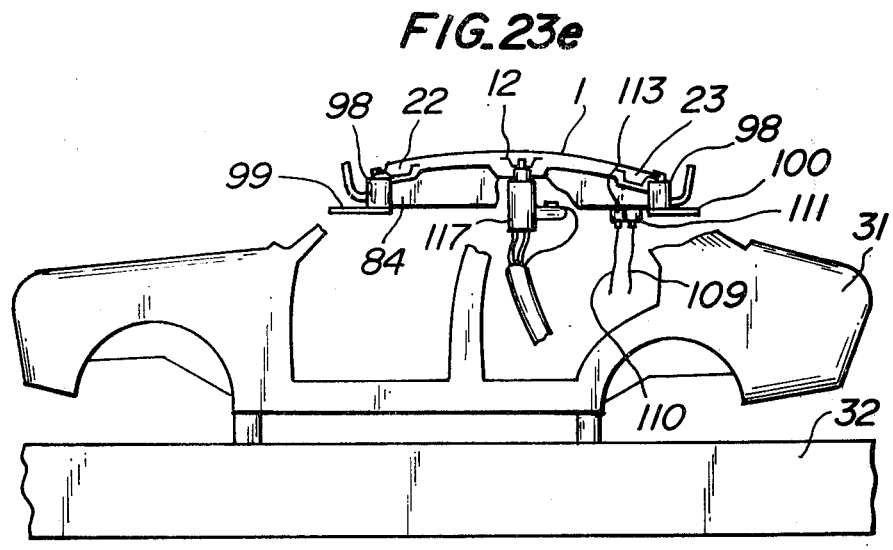

Then, the suction hose 109 is connected to the foaming mold 84 as shown in FIG. 23e and the electric supply source cord 110 is also connected to the mold. All the holes 96 of the connector 111 for the hose 109 are connected to the hose 109 as shown in FIGS. 8c and 9e and a heating member 114 embedded in the mold surface of the foaming mold 84 is connected to the connector 113 to the electric source cord 110. The mold surface of the foaming mold 84 is heated by the heating member 114 so as to preheat the lining skin member 6 and at the same time, air escapes through the holes 96 and the hose 109 so that the lining skin member 6 adheres to the recess corresponding thereto as shown in FIGS. 8c and 9e, and air in the space between the lining skin member 6 and the foaming mold 84 is exhausted through the air holes 95, so that the lining skin member 6 is well matched with the mold surface of the foaming mold 84 as shown in FIGS. 8c and 9e. In this manner, a space 115 to be filled by a foamed material is defined between the lining skin member 6 and the roof panel 1.

Figure 16:
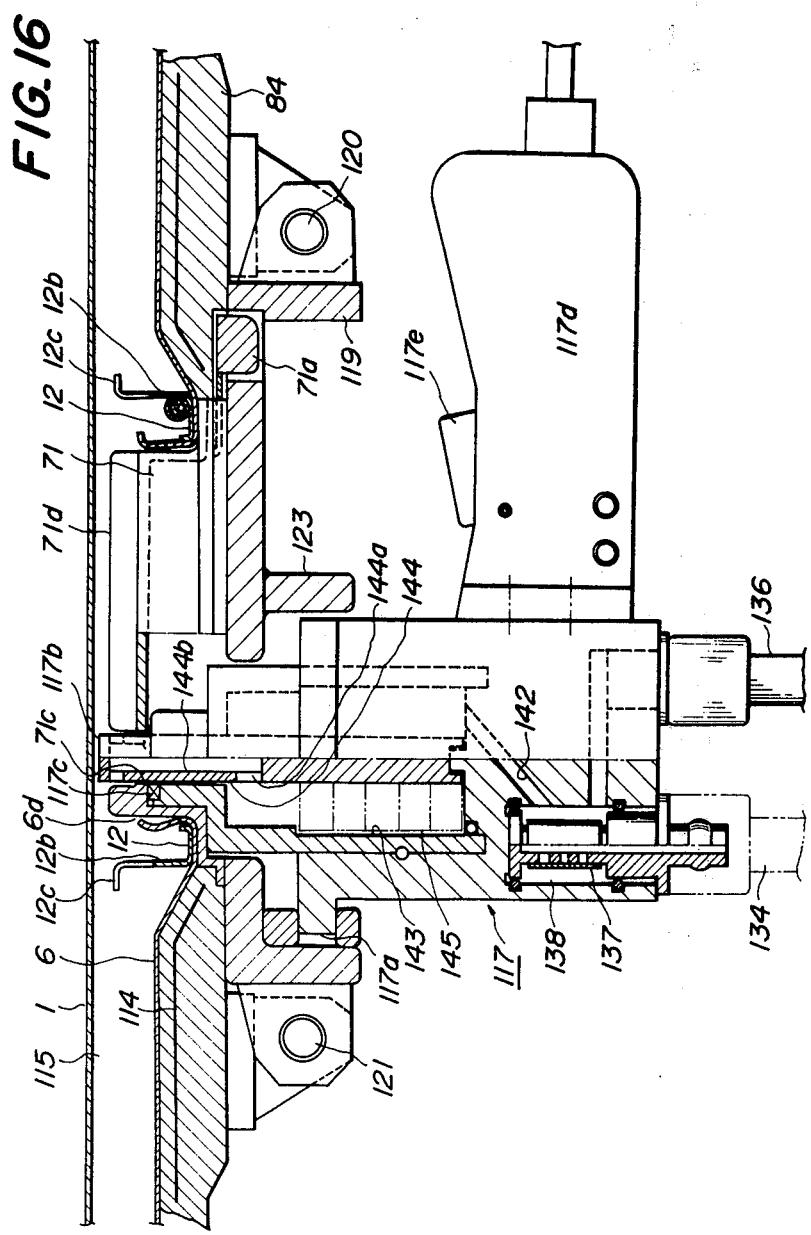
FIG. 16 is a side view showing the state of securing the mixing head to the foaming mold.
Figure 19:
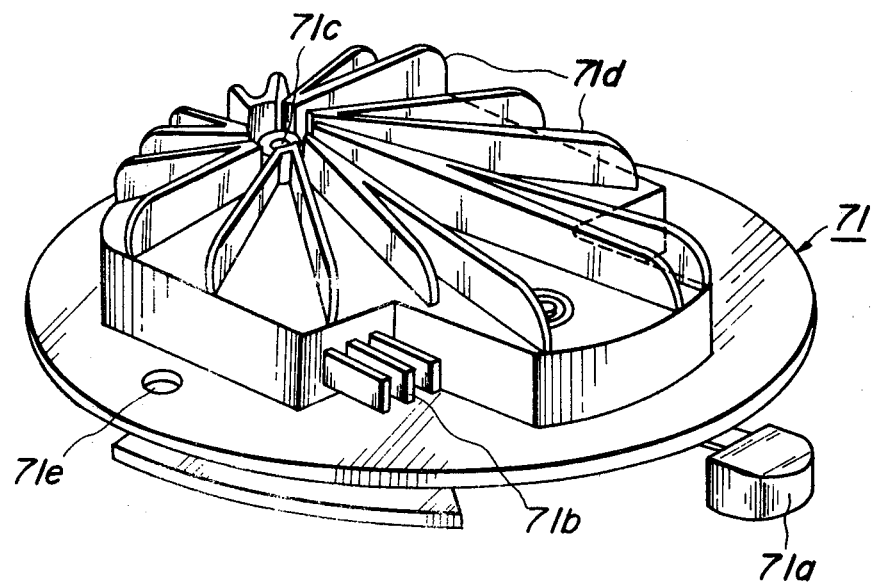
FIG. 19 is a perspective view showing the room lamp viewed from the roof panel side.

After the setting of the foaming mold 84 is completed as described above, the room lamp body 71 is secured as shown viewed from the roof panel side in FIG. 19. The room lamp body 71 comprises a switching lever 71a, a plug 71b, a through-hole 71c for inserting the end of a mixing head 117, and ribs 71d for guiding the foaming composition and for acting as reinforcements. When securing the room lamp body 71, a mixing head securing jig 119 provided on the foaming mold 84 as shown in FIGS. 7, 16 and 18 is rotated and opened around a hinge pin 120 (see FIGS. 16 and 18) by drawing a lock pin 121. In this state, the connector 76 of the harness 26 is mated to the plug 71b (see FIG. 19), and then the room lamp body 71 is secured to the opening 12a (see FIG. 22) of the roof bow 12 as shown in FIGS. 15, 16 and 18 by means of the screws 122 (see FIG. 15) which extend through the holes 71e (see FIG. 19) provided in the room lamp body 71. In this case, the room lamp body 71 sandwiches the periphery of an opening 6d of the lining skin member 6 against the roof bow 12 as shown in FIG. 16, thereby forming a seal between the room lamp body 71, the roof bow 12 and the lining skin member 6. The jig 119 being opened as described above to secure the room lamp body is closed as shown in FIGS. 16 and 18, and this closed position is maintained by inserting the lock pin 121. In addition, in FIG. 18, reference numeral 119a is a hole provided in the jig 119 for the purpose of reducing weight.

Thereafter, the hose 102 and the cord for electric supply source 110 shown in FIG. 23e, which are no more used, are removed from the connectors 111 and 113 thereby to complete the foaming mold setting step, and a heating step shown by 124 in FIG. 4 is applied to the body. The heating step 124 is used for heating a space 115 (see FIGS. 8c and 9e) to be filled with the foaming material, the roof panel 1 and the lining skin member 6 for defining this space, as well as the foaming mold 84 to a predetermined temperature (about 40° C. in case of an urethane foamed material) to produce a self-reaction of the foaming composition. As in FIG. 4, for example, the body in the foaming mold setting state is totally heated in a furnace in which heat discharged from the coating and baking oven 29 is guided through an exhaust duct 125.

The body thus heated is then subjected to a step of injecting a foaming composition shown by 126 in FIG. 4. In this step, a mixing head 117 of the foaming composition injecting device 116 is secured as shown in FIG. 23e, and for this purpose, as illustrated in FIGS. 16 and 18, a mixing head engaging ring 123 is secured to the jig 119. The engaging ring 123 is coaxially arranged in the through-hole 71c provided in the room lamp body 71, so as to engage the mixing head 117 at the position where the end 117b of the mixing head 117 is slightly projected from the through-hole 71c by co-acting with three claws 117a of the mixing head 117 by a bayonet mount system. In this case, an O-ring 117c of the mixing head 117 is pressed to the room lamp body 71, thereby to seal the mixing head 117 with the room lamp body 71.

When securing this mixing head, the worker operates a push-button 117e provided in a handle 117d of the mixing head and injects the foaming composition by means of the foaming composition injecting device 116 shown in FIG. 5. The foaming composition injecting device 116 is provided with tanks 127, 128 for storing a foaming solution A and a foaming solution B for preparing the foaming composition, pumps 130, 131 for supplying these solutions A and B to a branched unit 129 from these tanks and a control board 132, in addition to the mixing head 117. When the push-button 117e of the mixing head 117 is operated, its operation signal is transmitted to the control board 132 through a cable 133, thereby to actuate the branched unit 129 and properly supply the solution A from a tube 134, the solution B from a tube 135 and the compressed air from a tube 136, respectively, to the mixing head 117.

Figure 14B:
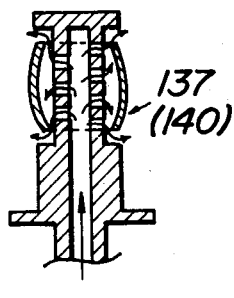
Figure 14C:
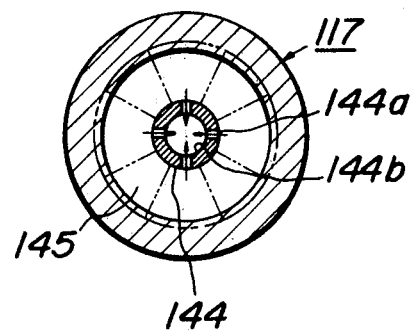
Figure 14D:
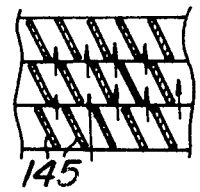
Figure 14E:
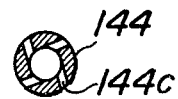

The mixing head 117 is constructed as shown in FIGS. 14a to 14e, and comprises a lead valve 137 connected to the tube 134 for the solution A and an air inlet portion 139 connected to the air tube 136 and arranged to communicate to a valve chamber 138 as shown in FIG. 14a as a pair. The mixing head is also provided with a lead valve (shown by an imaginary line 140) having the same construction as that of the lead valve 137 for the solution A connected to the tube 135 for the solution B (see FIG. 5), which is not particularly illustrated, and an air inlet portion (not shown) similar to the air inlet portion 139 connected to the air tube 136 in common as a pair. When compressing the solutions A and B, respective lead valves 138, 140 are opened as shown in FIG. 14b so that the solutions A and B are supplied together with the compressed air supplied from the air inlet portion 139 (the air inlet portion for the solution B is not shown), into a mixing chamber 143 from respective paths 141, 142 through respective valve chambers 138 (the valve chamber for the solution B is not shown). The mixing chamber 143 is provided with a blade 145 secured to the outer periphery surface of a rotary nozzle 144 therein, and this blade comprises a number of inclined blades which are discontinuous in the circumferential direction as shown in FIGS. 14c and 14d. The solution A and the compressed air as well as the solution B and the compressed air supplied to the mixing chamber 143 from the paths 141 and 142, respectively are, then, impinged with the blade 145 as shown in FIG. 14d to rotate the rotary nozzle 144 and supplied to an upper space 143a of the mixing chamber 143 as stirring while flowing in the direction of an arrow. The solutions A and B supplied to this space are injected together with the compressed air from the nozzle hole 144c illustrated in FIG. 14e through holes 144a, 144b of the rotary nozzle 144 as shown by an arrow in FIGS. 14a and 14c.

Figure 20A:
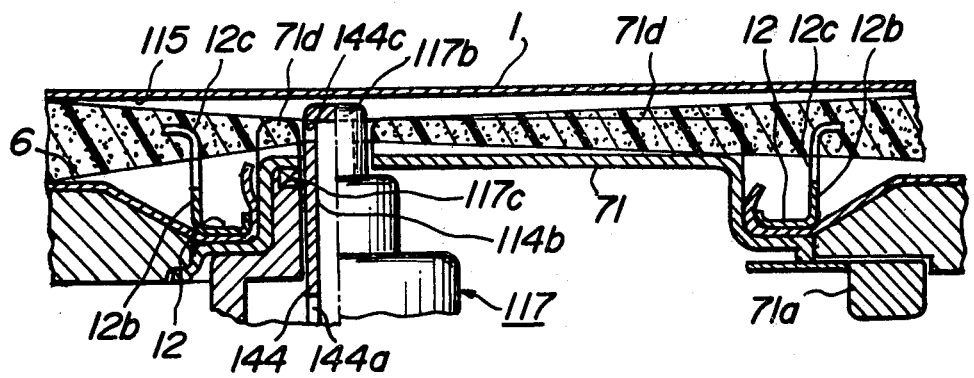
FIGS. 20a to 20c are cross-sectional views for explaining the step of injecting a foaming composition by the mixing head.

A mixed solution of the thus injected solutions A and B, that is, a foaming composition, is uniformly blown through the nozzle 144 as it is rotated and fills the space 115 along the ribs 71d of the room lamp body 71 as shown in FIG. 20a. In this case, in order not to prevent the flow of the foaming composition past the wall 12b of the roof bow 12, the upper edge of the wall is cut at a proper portion (see FIGS. 15 and 16). This cut is shown by 12c. The supply of the injected foaming composition to the space between the roof bow 12 and the lining skin member 6 is carried out by guiding the foaming composition by an upper opening channel of the channel-shaped roof bow 12 as shown in FIG. 22, but for this purpose, a plurality of through-holes 12d are provided and arranged in the roof bow 12 along the longitudinal direction thereof. These through-holes 12d are made larger as far as they are at the position remote from the room lamp securing opening 12a (portion for injecting the foaming composition) so as to make the supply of the foaming composition uniform in the longitudinal direction of the roof bow 12.

Figure 9F:
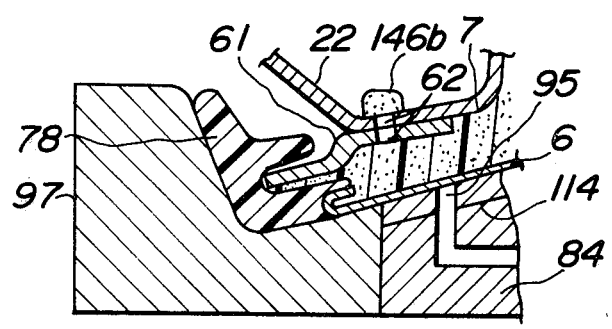
Figure 20B:
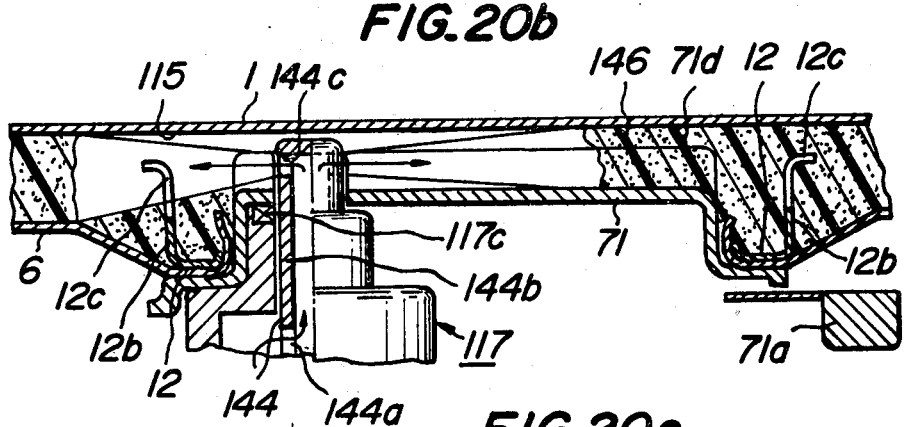
Figure 20C:
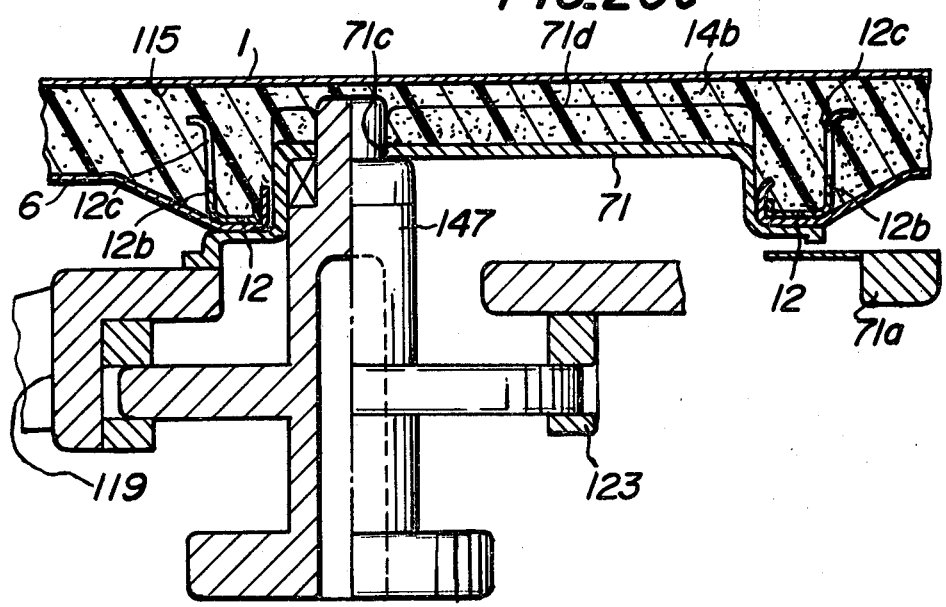
Figure 21:
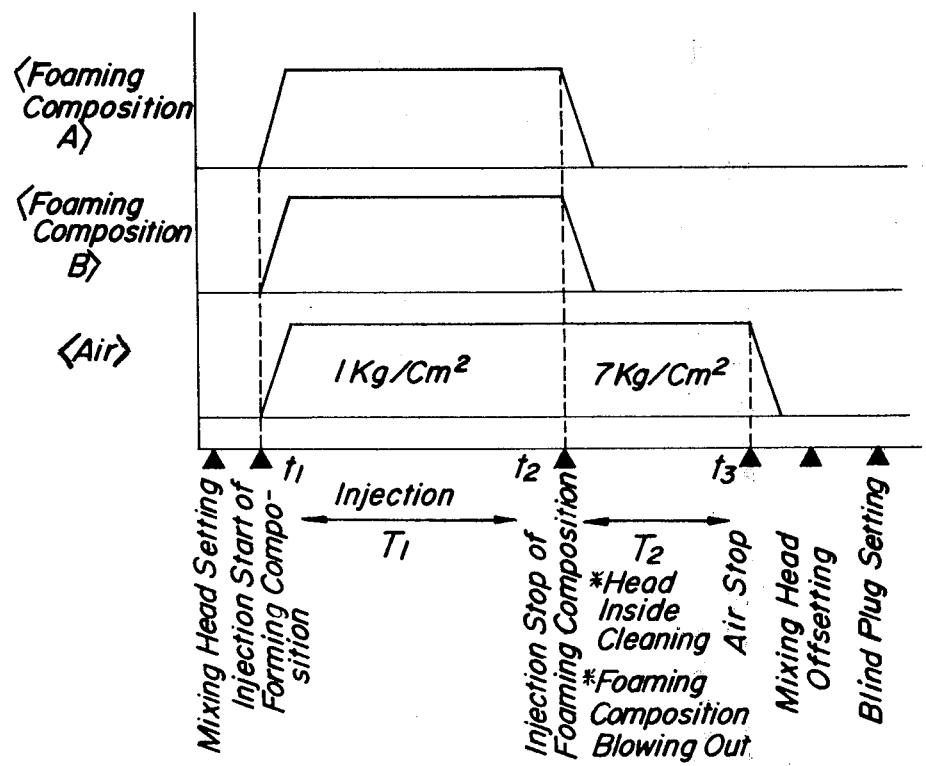
FIG. 21 is a flow chart of the foaming composition injecting work.

Thus, as shown in FIG. 21, at an instant $t_2$ after elapsed time $T_1$ necessary for injecting the foaming composition from the injection start of foaming composition shown by an instant $t_1$, the supply of the solutions A and B to the mixing head 117 is stopped and the compressed air is only continuously supplied to the mixing head. A supply pressure of the compressed air thereafter is, for example, raised from 1 kg/cm$^2$ to 7 kg/cm$^2$ to clean the mixing head. This compressed air forces out the foaming composition remained in the mixing head thereby to clean the head. In addition, the compressed air pushes the foaming composition 146 in the foaming material filling space 115 to the circumference thereof when leaving the nozzle hole 144c as shown in FIG. 20b. At an instant $t_3$ (see FIG. 21) after elapsed time $T_2$ (see FIG. 21) necessary for cleaning the mixing head, the supply of the compressed air is stopped, and at the same time, the mixing head 117 is removed from the set position shown in FIG. 16, and then a blind plug 147 is set with the use of the same ring 123 as shown in FIG. 20c in the same manner as in the case of the mixing head, thereby to close the through-hole 71c of the room lamp body 71. The foaming composition 146 pushed to the periphery of the space by the compressed air as shown in FIG. 20b moves back around the through-hole 71c as shown in FIG. 20c and completely fills the foaming material filling space 115, but in this case, the foaming composition 146 does not leak because the through-hole 71c is closed as described above. In addition, while the foaming composition is injected, the air sealed in the foaming material filling space 115 escapes through the air holes 40 shown in FIG. 8a, the air holes 62 shown in FIG. 9b and the air holes 66 shown in FIG. 10b. A part of the foaming composition 146 is forced out from these air holes 40, 62 and 66 at the time of completing the filling of the foaming composition as shown by 146b in FIG. 9f and 146c in FIG. 10d.

A curing step shown by 148 in FIG. 4 is applied to the body in which the foaming composition injecting step as described above is finished. This curing step is a waiting step during which the foaming composition injected as described above completes its foaming by a self-reaction. After the foaming, the foamed layer 7 (see FIG. 2) is formed between the roof panel 1 and the lining skin member 6, whereby the lining skin member 6 maintains its final shape and completes a final formation as a ceiling 5 together with the foamed layer 7.

Figure 23F:
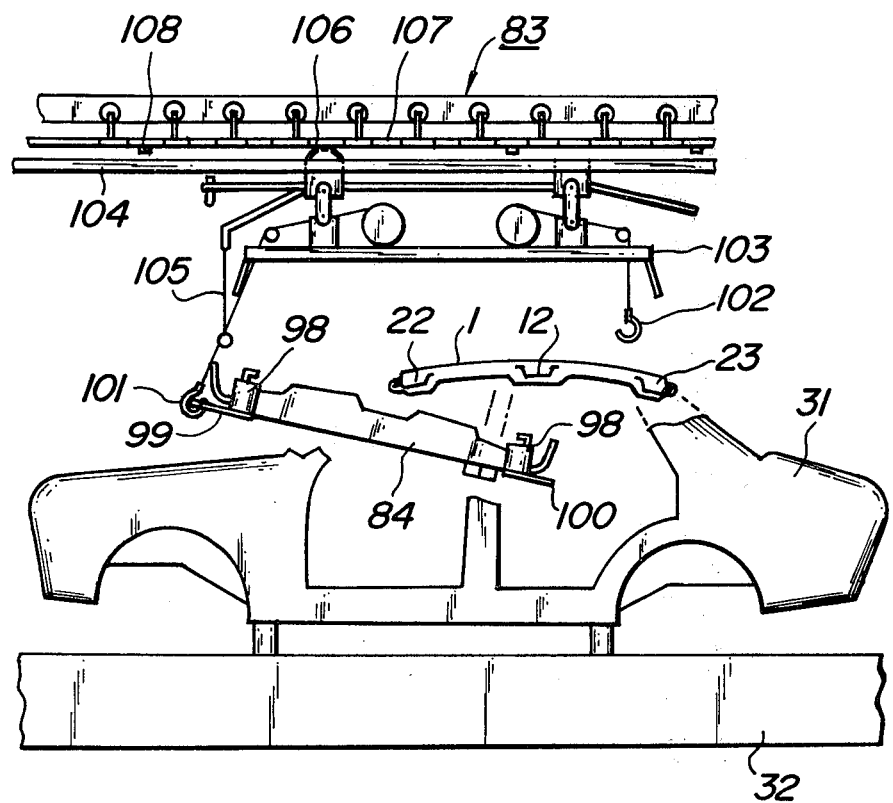

The next foaming mold off setting step 149 shown in FIG. 4 is thereafter carried out. In this step, at first, the blind plug 147 under the setting condition shown in FIG. 20c is released from the ring 123 and removed from the mixing head securing jig 119. Then, the foaming mold 84 is removed in the order reverse to the manner in which it was set. That is, the carriage 103 sent by the conveyor 107 is released from the conveyor 107 by operating the lever 105 so as to make it free. Then, the hooks 101, 102 are hooked to the handles 99, 100 of foaming mold corresponding to the hooks 101, 102 and the clamp 98 is released. The foaming mold 84 is then suspended as shown in FIG. 23c, and in this condition, the hook 102 is firstly removed from the handle 100 as shown in FIG. 23f, the rear end of the foaming mold 84 is pushed out of the front window of the body 31 by hand. In this case, the carriage 103 moves along the guide rail 104 so as to smoothly carry out the above removal of the foaming mold 84. After removal the foaming mold 84, the handle 100 is again hooked to the hook 102, the foaming mold 84 is suspended downward the carriage 103 by means of the hooks 101, 102, and the carriage 103 is driven and engaged with the conveyor 107 by operating the lever 105 so as to transfer the foaming mold 84.

This used foaming mold 84 is transferred to a foaming mold cleaning step shown by 150 in FIG. 4 by the carriage 103 and cleaned by removing foreign matter adhering to the mold surface, and thereafter conveyed to a stage shown in FIG. 5 for a foaming mold setting step 82 to the next car body by synchronizing with the conveyor of the body. In addition, reference numeral 151 shows a route of the carriage 103 in FIG. 4, that is, a route that the carriage 103 for suspending the foaming mold to be set in the body at the foaming mold setting step 82 is transferred from the stage shown in FIG. 5 as descried above with respect to FIG. 23d under the empty state and again back to the same stage to hang the used foaming mold.

According to the above process, the foaming mold 84 is removed and the ceiling is molded and formed into a final shape as shown in FIGS. 2 and 3, and then the car body is conveyed to next manufactured stage from the stage shown in FIG. 5.

According to the present invention, the ceiling is integrally molded by filling a foaming composition between the roof panel and the lining skin member and by foaming before the equipment line, so that the conventional assembling work in the equipment line can be omitted and the assembling workability of the other equipment parts can be improved.

Moreover, the lining skin member is made of a flexible material, so that a ceiling can be molded into any shape without any limitation in design. Moreover, the material cost is cheap because the foaming composition is only filled and foamed between the roof panel and the lining skin member. The present invention provides the structure of filling a foamed material between the roof panel and the lining skin member, so that the strength of the ceiling is increased, and the soundproof effect is improved. In other words, the roof panel can be made thinner and the material cost becomes cheaper.

What is claimed is:

1. A method of manufacturing a ceiling structure of a vehicle and substantially simultaneously attaching said structure to a preexisting roof panel already secured to a body of said vehicle, wherein said body includes a roof bow mounted to said roof panel and pillars mounted to said roof panel, said pillars having inner panels, and wherein said roof panel has an inner periphery with a rail member which forms a gap with the remainder of said roof panel and forms a linear joint with said pillar inner panels, said roof panel including holes for securing parts to each rail, and wherein a room lamp body is mounted to said roof bow, the method comprising: a step of closing off by masking said gap formed between said roof rail member and the remainder of said roof panel, said linear joint portion between said roof rail and said pillar inner panels, and said holes for securing parts on said roof rail except an opening in said roof bow for mounting said room lamp body; a step of securing a wire harness assembly including a room lamp wire harness and an overhead console wire harness at given positions and securing a lining skin member of said roof panel by fitting welts provided around the periphery of said lining skin member to the roof panel in order to fit said lining skin member to the vehicle body resulting in an attachment of the ceiling structure to the vehicle body upon completion of the ceiling structure and to close the space between the lining skin member and the roof panel except at an opening in the roof bow; a step of mounting a foaming mold having a mold surface with the same shape as a final shape of the lining skin member for molding a foamed material to said roof panel from the compartment side of the vehicle; a step of preheating the lining skin member to a given temperature by a heating member embedded in the foaming mold and exhausting air existing between the lining skin member and the foaming mold through exhaust holes provided in the foaming mold in order to cause the lining skin member to take its final shape and to form a space to be filled with foaming material between said roof panel and said lining skin member; a step of heating said space to be filled with foaming material, said roof panel and said lining skin member and said foaming mold to obtain a temperature suitable for a self-reaction of a foaming composition by totally heating the vehicle body in a furnace in which heat discharged from a coating and baking oven is guided through an exhaust duct; a step of injecting a urethane foaming composition into said space formed between the roof panel and the lining skin member through the opening provided in said room lamp body; a step of curing the lining skin member and the urethane foaming composition, and a step of removing the foaming mold from the vehicle body after foaming.

2. A method as claimed in claim 1, wherein the room lamp body comprises a switching lever, a plug and a plurality of ribs and wherein said step of injecting includes guiding said urethane foaming composition radially by said plurality of ribs from said hole in said room lamp body.

3. A method as claimed in claim 1, wherein said roof rail member is provided along the entire periphery of said roof panel to reinforce the roof panel and wherein said closing off step includes closing a gap formed along the entire roof rail member to seal a space between said roof panel and said lining skin member.

4. A method as claimed in claim 3, wherein said roof rail member comprises a front roof rail, a rear roof rail which have a plurality of air holes, respectively, and a side roof rail.

5. A method as claimed in claim 4, wherein said lining skin member is provided with welts around the periphery and tongue members and wherein said step of securing said lining skin member includes overlapping said tongue members on said pillars, respectively, thereby to seal a space between said roof panel and said lining skin member.

6. A method as claimed in claim 5, wherein the side roof rail comprises an outer panel member, an inner panel member having a plurality of air holes and a sealing bead and a flange portion formed by integrally connecting the outer and the inner panel member so that the side roof rail is attached to the roof panel by a roof drip provided on the outer panel member.

7. A methd as claimed in claim 1, wherein the roof bow is parallel to the front and rear roof rails.

8. A method as claimed in claim 2, wherein the foaming mold comprises a body having an opening at its center for receiving said room lamp and inserting through said opening of the room lamp a mixing head for injecting the urethane foaming composition, a plurality of air holes provided at its periphery, and a plurality of suction holes; a sealing portion contiguously extending at the periphery of the foaming mold, a plurality of clamps arranged to the sealing portion at suitable intervals and handles projected from the front and the rear ends of the foaming mold.

9. A method as claimed in claim 8, wherein the step of exhausting air includes exhausting said air through the air and suction holes to fit the lining skin member to the mold surface and hold it to a desired shape thereby to define said foaming composition filling space between the roof panel and the lining skin member.

* * * * *